(12) United States Patent
Poirier et al.

(10) Patent No.: US 9,419,727 B1
(45) Date of Patent: Aug. 16, 2016

(54) UNDERSEA LASER COMMUNICATION USING POLARIZATION AND WAVELENGTH MODULATION

(71) Applicants: Peter Marshall Poirier, San Diego, CA (US); Michael Garrett Lovern, Chula Vista, CA (US); Burton Hamilton Neuner, III, San Diego, CA (US)

(72) Inventors: Peter Marshall Poirier, San Diego, CA (US); Michael Garrett Lovern, Chula Vista, CA (US); Burton Hamilton Neuner, III, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/681,944

(22) Filed: Apr. 8, 2015

Related U.S. Application Data

(60) Provisional application No. 62/120,419, filed on Feb. 25, 2015.

(51) Int. Cl.
*H04B 10/80* (2013.01)
*H04B 10/508* (2013.01)

(52) U.S. Cl.
CPC .............. *H04B 10/80* (2013.01); *H04B 10/508* (2013.01)

(58) Field of Classification Search
CPC ............................... H04B 10/80; H04B 10/508
USPC .......................................................... 398/104
See application file for complete search history.

(56) References Cited

U.S. PATENT DOCUMENTS

| 7,609,608 | B2 | 10/2009 | Rogerson et al. | |
|---|---|---|---|---|
| 2013/0272715 | A1* | 10/2013 | Eber | H04B 10/1141 398/106 |
| 2014/0341584 | A1* | 11/2014 | Hopewell | H04B 10/80 398/104 |
| 2015/0219765 | A1* | 8/2015 | Mead | H01S 3/06754 356/5.09 |

OTHER PUBLICATIONS

Cox, Hughes, Muth; A Polarization Shift-Keying System for Underwater Optical Communications; IEEE Oceans 2009 Conference; 2009.
Poirier, Neuner III; Undersea Laser Communication Using Polarization and Wavelength Modulation; Applied Optics, vol. 53, No. 11; Apr. 10, 2014.

\* cited by examiner

*Primary Examiner* — Leslie Pascal
(74) *Attorney, Agent, or Firm* — SPAWAR Systems Center Pacific; Kyle Eppele; J. Eric Anderson

(57) ABSTRACT

A communications method comprising the following steps: emitting a series of pulses from a transmitter through water, wherein each pulse comprises a plurality of electromagnetic component signals, wherein each component signal has a fixed combination of wavelength and polarization state that differs from the wavelength and polarization state combinations corresponding to the other component signals; encoding data onto each pulse by varying the amplitude of selected component signals of each pulse; receiving each pulse with a receiver; and retrieving the data by detecting the component signals based on the component signals' wavelength, polarization state, and amplitude.

14 Claims, 20 Drawing Sheets

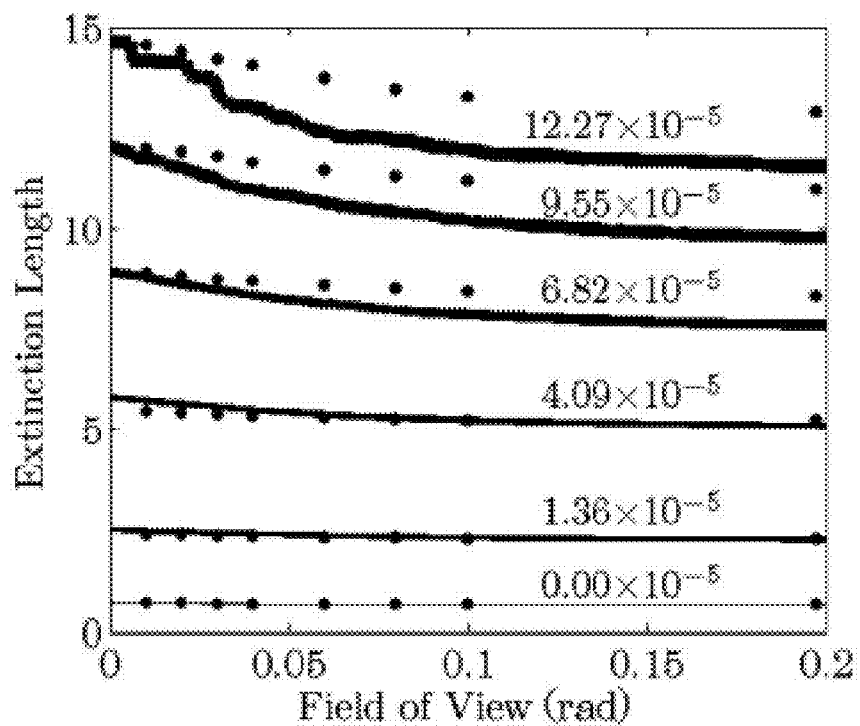
*Fig. 8A*
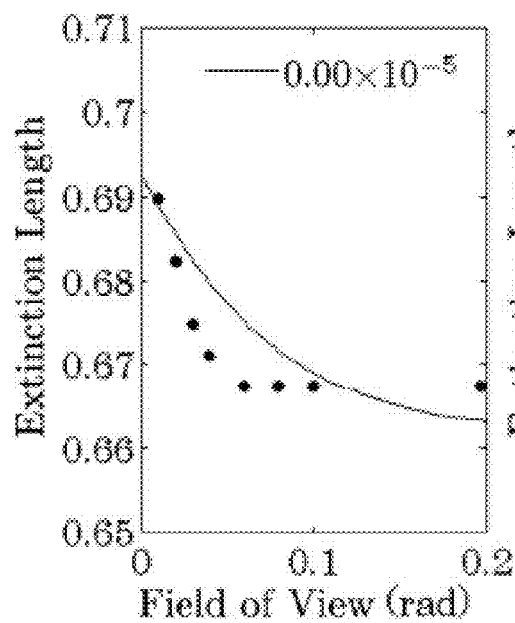 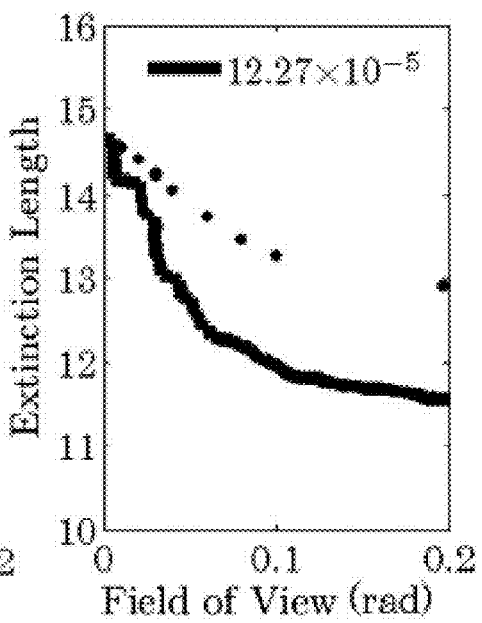
*Fig. 8B*    *Fig. 8C*

$S_0 = I$
$S_1 = Ip\cos2\psi\cos2\chi$
$S_2 = Ip\sin2\psi\cos2\chi$
$S_3 = Ip\sin2\chi$

UNDERSEA LASER COMMUNICATION USING POLARIZATION AND WAVELENGTH MODULATION

CROSS-REFERENCE TO RELATED APPLICATION

This application claims priority to U.S. Provisional Application No. 62/120,419, filed 25 Feb. 2015, titled "Undersea Laser Communication Using Polarization and Wavelength Modulation" (Navy Case 102540).

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102540.

BACKGROUND OF THE INVENTION

The invention described herein relates to the field of underwater, high-data-rate communications. The state-of-the-art in technologies for underwater high data rate communications is currently limited. There is a need for an improved method and system for high-data-rate communications between underwater platforms.

BRIEF DESCRIPTION OF THE DRAWINGS

Throughout the several views, like elements are referenced using like references. The elements in the figures are not drawn to scale and some dimensions are exaggerated for clarity.

FIGS. 8A-8C are plots of extinction length versus field of view.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
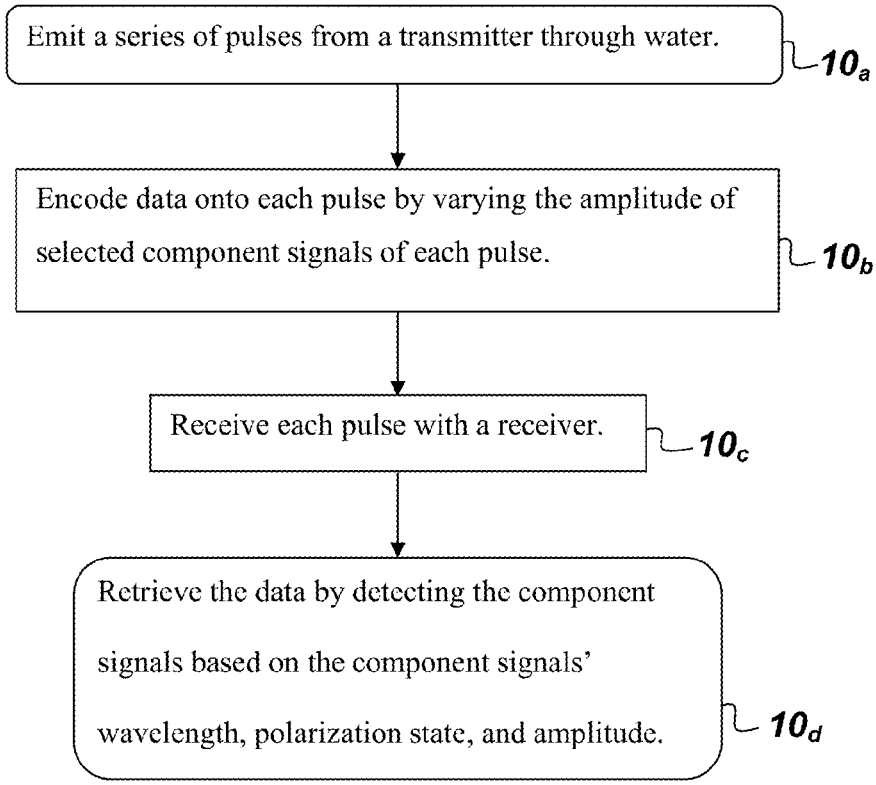
FIG. 1 is a flowchart of a communications method.

FIG. 1 is a flow chart of a communications method 10 that may be used for transmitting data underwater. Method 10 comprises, consists of, or consists essentially of the following steps. The first step $10_a$ provides for emitting a series of pulses from a transmitter through water. Each pulse may comprise a plurality of electromagnetic component signals. Each component signal may have a fixed combination of wavelength and polarization state that differs from the wavelength and polarization state combinations corresponding to the other component signals. The second step $10_b$ provides for encoding data onto each pulse by varying the amplitude of selected component signals of each pulse. The third step $10_c$ provides for receiving each pulse with a receiver. The fourth step $10_d$ provides for retrieving the data by detecting the component signals based on the component signals' wavelength, polarization state, and amplitude.

Method 10 may be used to increase the data rate of a free-space all-undersea laser communication link using polarization and wavelength modulation. Measurements were made at various background light levels to estimate the required power increase as a function of bits per pulse. Transmission measurements were made of laser light through a two-meter-long tube filled with a mixture of Maalox® and water to simulate ocean-water conditions for several receiver field-of-view (FOV) angles. A degree of polarization greater than 98% was measured at FOVs up to 100 mrad at an attenuation of 14 extinction lengths. Method 10 may be used for blue-green (BG) free-space optical (FSO) communication. A FSO-based system can provide a wireless/fiberless high data rate communication link between undersea platforms such as underwater environmental sensors or autonomous underwater vehicles (AUVs).

Semiconductor lasers supplied by Nichia and light-emitting diodes (LEDs) are capable of megahertz modulation at average powers up to watts, with potentially higher power efficiencies than transmitters that use externally modulated diode-pumped solid-state lasers. High-sensitivity, high-speed photomultiplier-tube (PMT) detectors from Hamamatsu and Photonis USA are available with 100 MHz bandwidth and can potentially be operated at higher rates with some modifications. Such lasers and detectors may be used in conjunction with method 10. Therefore, the bandwidth limitation of these devices should be taken into consideration along with the techniques described herein.

A polarization and wavelength modulation embodiment of method 10 was investigated through laboratory experimentation. In this embodiment, the transmitter consisted of a laser source(s) that is either polarized-state modulated, wavelength modulated, or both. The pulse modulation rate was lower than the data rate, as there was greater than one bit per pulse. A detector(s) with polarizing element(s) in front of the detector(s) was used to determine the polarization "state" of light. A separate detector(s) with filter(s) in front of the detector(s) was used to determine the wavelength of light. Propagation modeling determined the effect of the water channel on the distribution of power as a function of the receiver FOV. A verification of the model was made with a water tube filled with simulated seawater.

Commercial antacid preparation Maalox® contains a suspension of aluminum hydroxide and magnesium hydroxide microparticles, which scatter light similarly to natural seawater. A set of three detectors may be used to determine all Stokes parameters of the incoming pulse of light. Calibration pulses could be interleaved within the pulse stream to account for amplitude fluctuations caused by the water channel. If the transmitter operates with powers exceeding those required for a minimum signal-to-noise ratio (SNR), then the transmitter source(s) can be wavelength and/or polarization state modulated. In this way, the combined modulation can provide discrete amplitude steps of the received signal from the detector(s) that can be differentiated into polarization state and/or wavelength necessary to obtain multiple combinations, C, for each pulse. The resulting data rate is $B \log_2 C$, where B is the laser/detector pulse bandwidth.

Data-rate multiplication (DRM) can be achieved through several techniques. Multiplexing of N simultaneous channels results in a DRM of N. These channels can be separated by wavelength, such as in wavelength-division multiplexing (WDM), using N laser sources and N detectors with a different filter placed in front of each associated detector. For optical communications using fiber or air as a medium, the wavelengths can be separated with fiber-optic couplers. However, coupling light into fiber is a challenge for FSO communication in ocean water. Channels can also be separated using two orthogonal polarization states with different polarizing elements in front of each associated detector for a DRM of 2. The data rate can be multiplied using multiple digital-time positions or amplitudes for each pulse. Time-position-modulation techniques, such as pulse-position modulation (PPM), decrease data rates for systems that are limited to a minimum pulse width. The response times of the transmitting light source, receiver detectors, and associated electronics generally limit the minimum pulse width. In contrast, digital-amplitude modulation or multilevel-pulse-amplitude modulation or amplitude-shift keying (MPAM or MASK) can significantly increase the data rate in a single channel by $DRM=\log_2 M$, where M is the number of discrete levels. A combination of WDM and MPAM will result in $DRM=N \log_2 M$. There is a power penalty associated with MPAM in that the energy per pulse must be greater than binary pulses, such as in on-off keying (OOK), where M=2. Wavelength modulation differs from WDM in that there is only one channel with one wavelength per pulse. The wavelength information is obtained by a detector(s) with an associated wavelength-dependent optical filter(s), where each wavelength results in a discrete measured amplitude. For a single detector, the value of W is equal to M. For multiple detectors, the maximum number of distinguished wavelengths is =(D+1)(M−1), where D is the number of detectors. For wavelength modulation, the increase in data rate is similar to MPAM, $DRM=\log_2 W$. Polarization modulation differs from orthogonal polarization-channel multiplexing in that there is only one channel with one polarization state per pulse. The polarization-state information is obtained by a detector(s) with an associated polarization element(s), where each polarization state results in a discrete, measured amplitude. The data rate increases by $DRM=\log_2 P$, where P is the number of discrete polarization states measured by the detector(s). There is no direct mathematical representation for the relationship between the number of detectors, number of amplitude levels, M, and P. However, for a single detector, P=M. In addition, three detectors is the number to determine all Stokes parameters, normalized to the intensity, which is the first Stokes parameter. Thus, a combination of wavelength and polarization modulation, where each pulse has a distinct polarization state and wavelength, will yield a data rate increase of $DRM=\log_2(WP)$.

Figure 2:
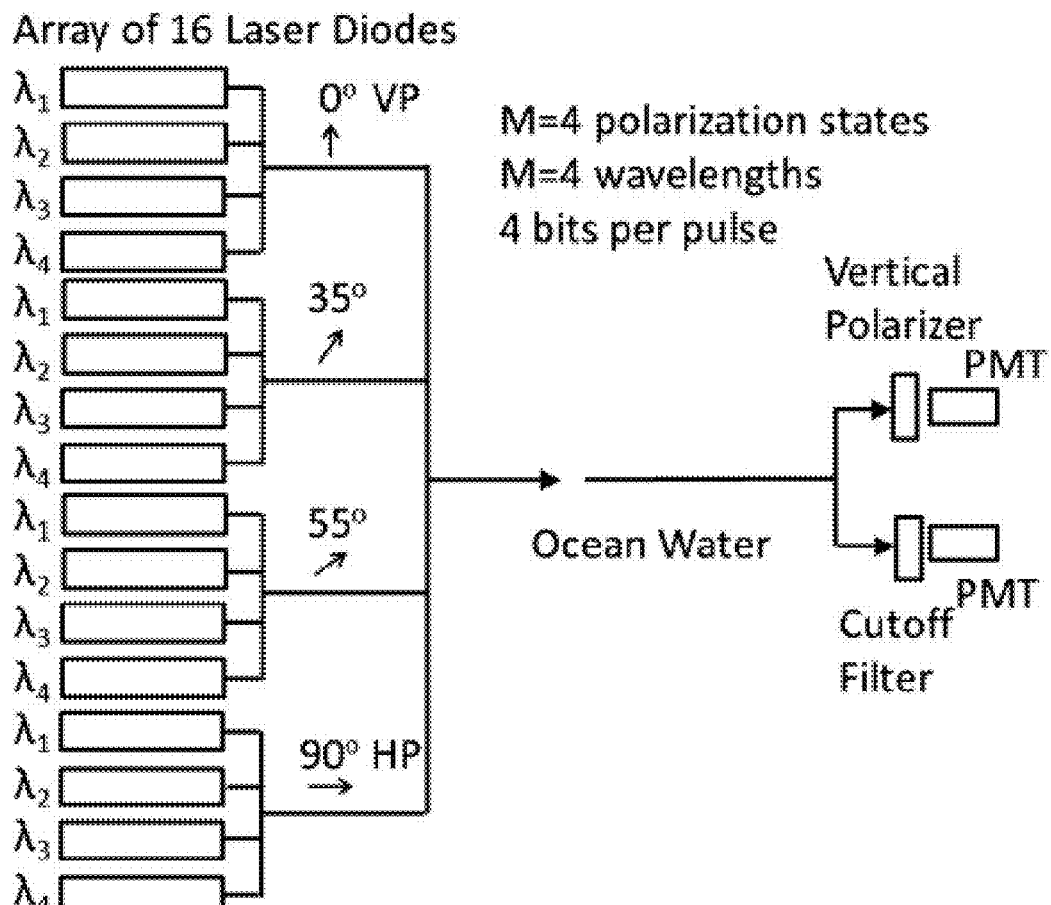
FIG. 2 is an illustration of an embodiment of a communications system.

FIG. 2 is a block diagram of a combination of 16 (4 bits/pulse) polarization states and wavelengths. Each laser diode in the transmitter has a distinct polarization state (linear 0°, 35°, 55°, and 90° orientation for M=4) and a distinct wavelength (wavelengths 1-4). In this embodiment, only one of the lasers in the array emits light during a pulse interval and the receiver consists of two PMT detectors. The first PMT detects the vertical polarization component. The second detects one of four amplitude levels after the light passes through a cutoff filter. For each of these techniques, there is a tradeoff between DRM and size, weight and power (SWaP) increase due to the necessary measurement of discrete MPAM levels. Both polarization and wavelength modulation rely on the ability to distinguish between multiple digital amplitudes similar to the direct MPAM technique. The SNR is typically expressed for MPAM as $E_b/N_o$, where $E_b$ is the energy per bit and $N_o$ is the noise. For low M values, the increase in required $E_b/N_o$ for the same symbol error rate is about 4 dB for every integer increase in bit value. For higher M values, there is a 6 dB increase.

Figure 3:
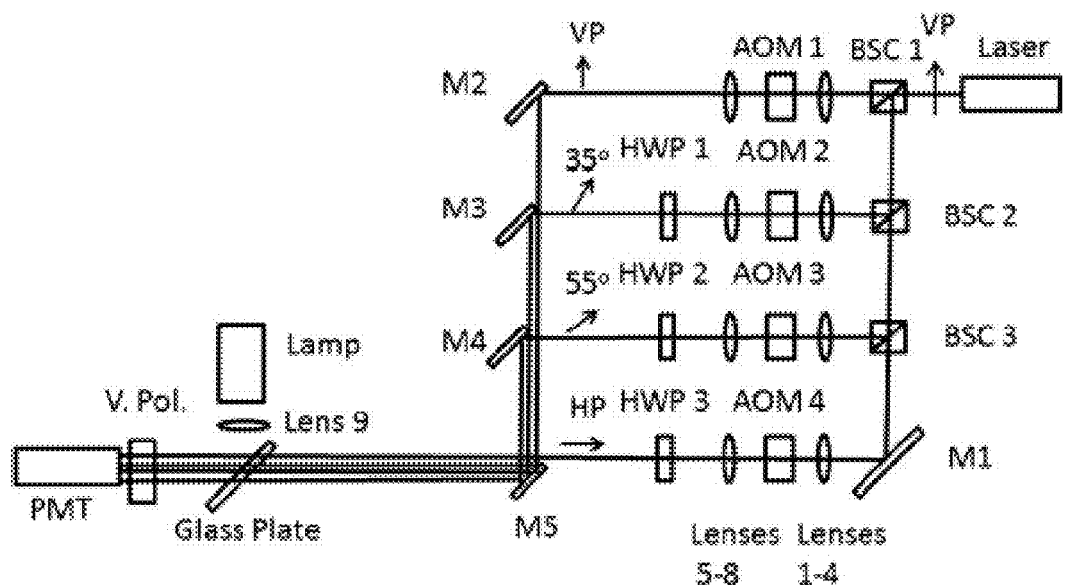
FIG. 3 is an illustration of an embodiment of a communications system.

FIG. 3 is a polarization-modulation embodiment of equipment that may be used with method 10. Laboratory measurements of bit-error-rate (BER) were made for MPAM levels of 2, 3, and 4 produced using polarization modulation using the embodiment depicted in FIG. 3. Three nonpolarizing beam-splitter cubes (BSC) and a mirror split the beam into four paths, each with an acousto-optic modulator (AOM) with associated lens for focusing (Lenses 1-4) and collimating (Lenses 5-8). Three of the modulated beams pass through half-wave plates (HWP) to produce the four polarization states. Four mirrors direct the parallel beams to the vertical polarizer (V. Pol.) and PMT detector. Two light sources were used. The first light source was a continuous wave, 100-mW doubled-neodymium-doped vanadate laser operating at 532 nm wavelength, modulated by four AOMs, each with a distinct polarization output (linear 0° (VP), 35°, 55°, and 90° (HP) orientation for M=4) and equal pulse-energy output. Half-wave plates positioned at the output first-order beam of three out of four AOMs were used to produce the different states. The second light source was a 150 W OSL1 white-light lamp (Thorlabs®) used to simulate solar background. The output was measured with a vertical linear polarizer positioned in front of a R750 bialkali PMT detector (Hamamatsu®). The power amplitude of the laser and lamp were varied independently using calibrated neutral-density filters. A partially reflecting glass plate at a 45° incident angle was used to reflect the beam of nearly collimated white light from the lamp and coaligned with the laser output from all four AOM first-order beams into the detector. Three synchronized pulse generators (two Tektronix® AFG3252 and one HP® 8015A) were used to generate the input binary digital pulses for each AOM and the reference MPAM pulse-repetitive sequence (e.g., 01230123... for M=4). The output of the PMT was sent through a 50-dB-gain amplifier and into a National Instrument® PCI-MIO-16E-1 DAQ board. The SNR was calculated based on power measurements of the laser and lamp incident on the PMT detector and on estimates of dark current. The power SNR calculation was based on the following formula:

$$SNR = K_S^2/(K_s + K_N) \quad (1)$$

where $K_S$ and $K_N$ are the total average signal and noise photoelectrons for each pulse, respectively. The noise photoelectrons were assumed to be the sum of the white-light background photoelectrons and the dark-current electrons. The BER was calculated using LabVIEW® software that determined the threshold for each MPAM level using the following formula for the ith level (i=1 to M−1):

$$T(i) = 3s\left[\left(\frac{i}{M}\right) - 0.5\right] + m \quad (2)$$

where s is the standard deviation and m is the mean of all data points. For example, if M=4, there are four levels (0, 1, 2, and 3) and the threshold to distinguish between a value of 2 or 3 is T(3)=(0.75 s+m). Pulse frequencies of 100 Hz and 100 kHz were used for this initial series of experiments. Subsequent tests up to 100 MHz were attempted with a silicon-photodiode detector, but the bandwidth limitation of the AOMs and detector precluded testing of low-BER comparisons between various MPAM levels.

Figure 4A:
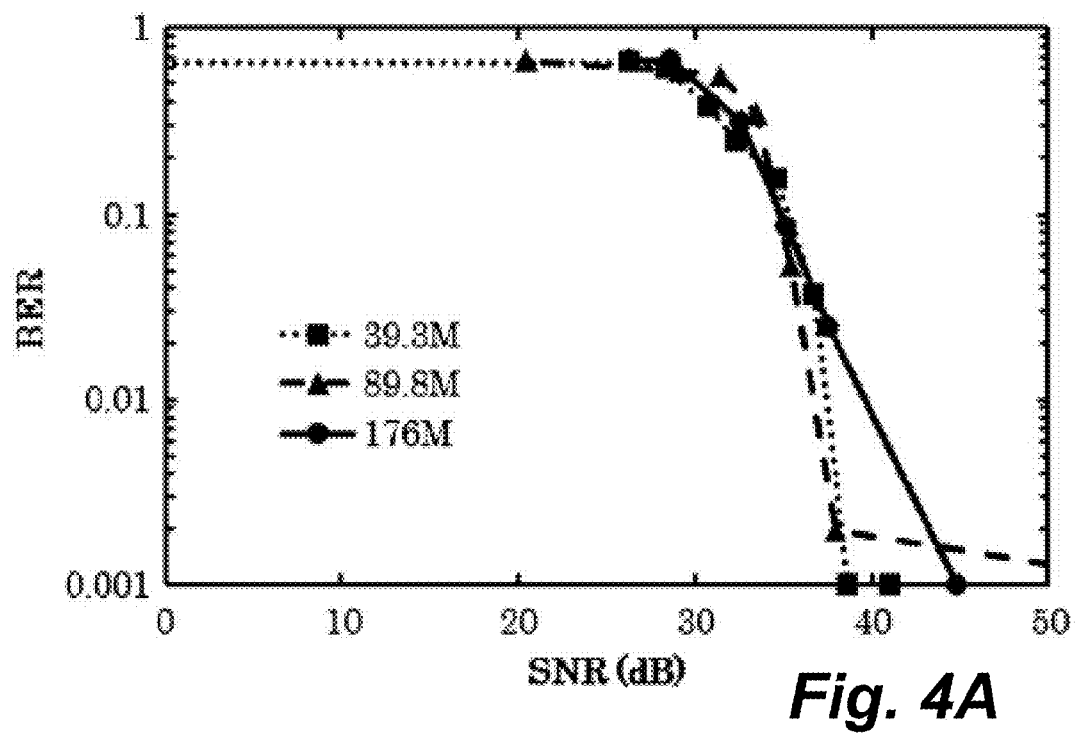
FIGS. 4A and 4B are plots of bit-error-rate values versus signal to noise ratios for various M levels.
Figure 4B:
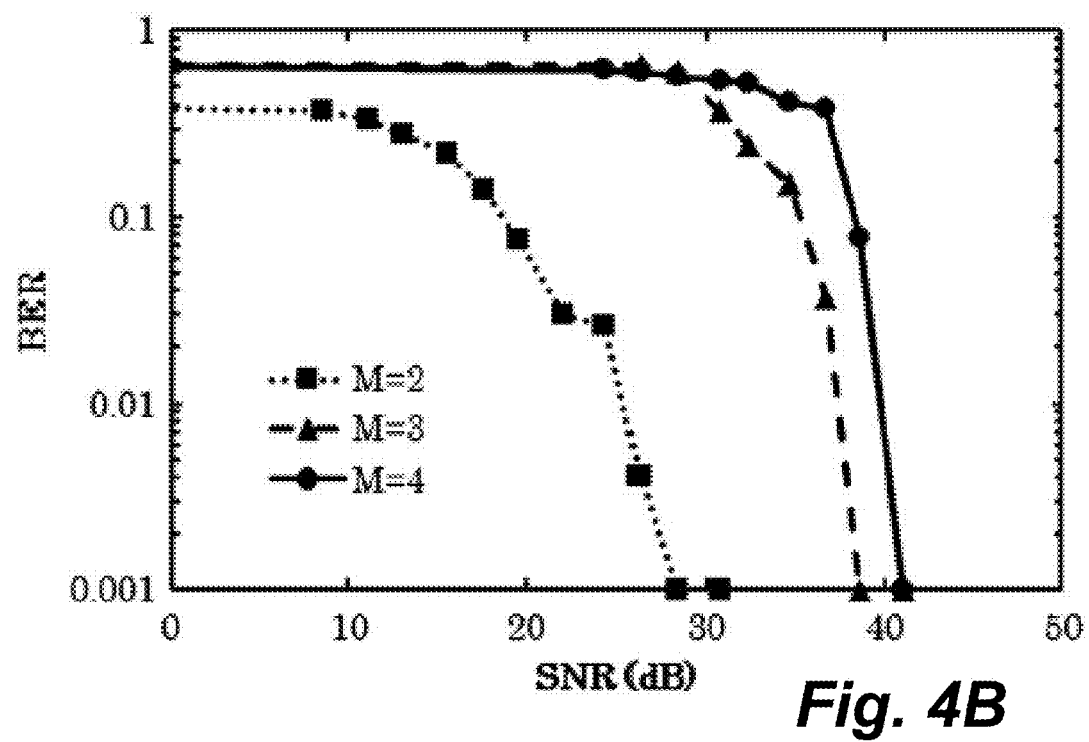
Figure 5A:
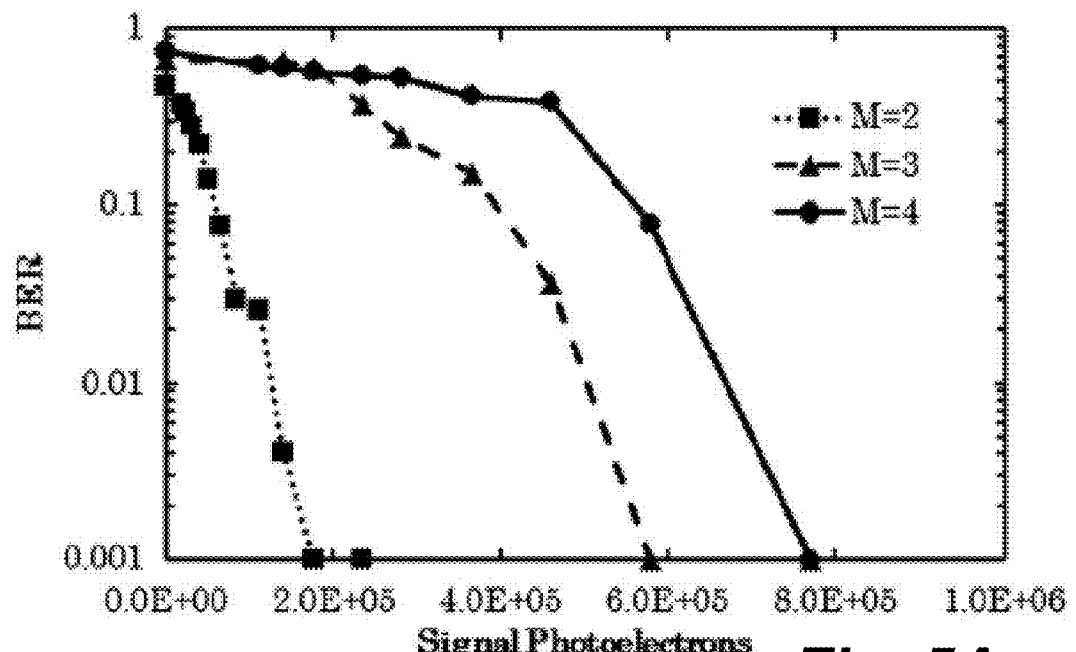
FIGS. 5A and 5B are plots of bit-error-rate values versus signal photoelectrons for various M levels.
Figure 5B:
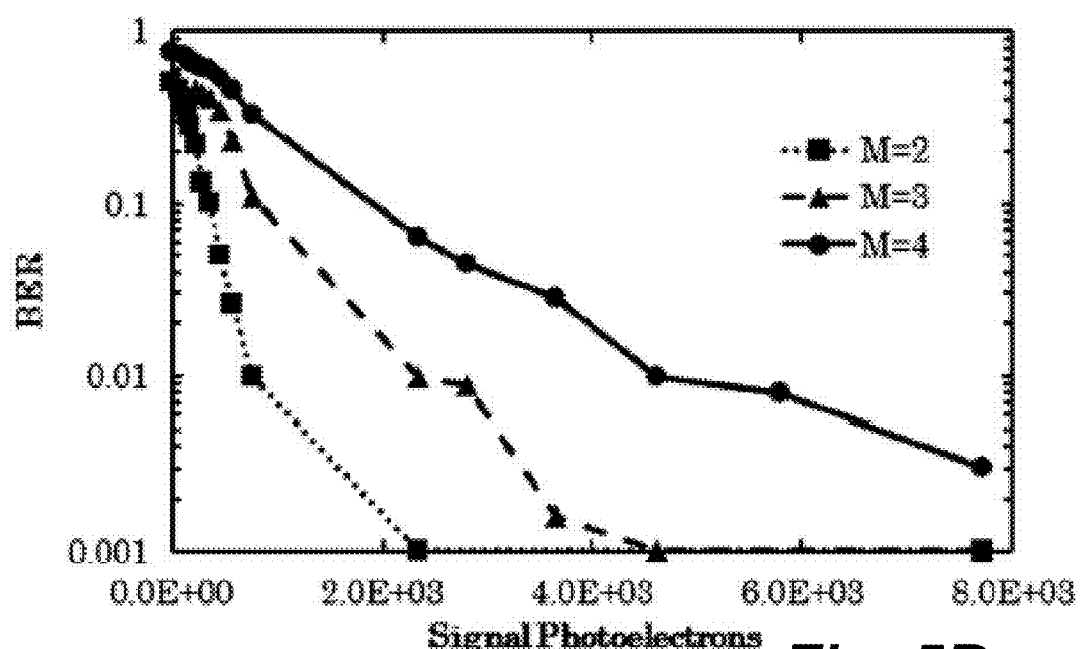

FIG. 4A illustrates the relationship between calculated SNR and measured BER for M=3 at different lamp background photoelectron levels (39.3-176 million) and 100 Hz. The data indicate a similar BER is obtained at similar SNRs at different background levels. FIGS. 4B-5B illustrate the difference between required SNR and signal photoelectrons for various M levels with a constant background level (i.e., 39.3× $10^6$ background photoelectrons at M=2, 3, and 4 at 100 Hz). The increase in SWaP is a function of required pulse energy given the same minimum pulse width. The increase of photoelectrons or maximum pulse energy for the same BER was calculated for M=2, 3, and 4 with various background levels. The variance between required pulse energy for M=2, 3, and 4 levels ranged from 0.6 to over 10. However, the average value of 4 and 8 times increases in pulse energy for M=3 and 4 values, respectively, relative to the binary, M=2, case was estimated from the data. This is consistent with the 4-6 dB increase in pulse energy per bit per noise.

Figure 6:
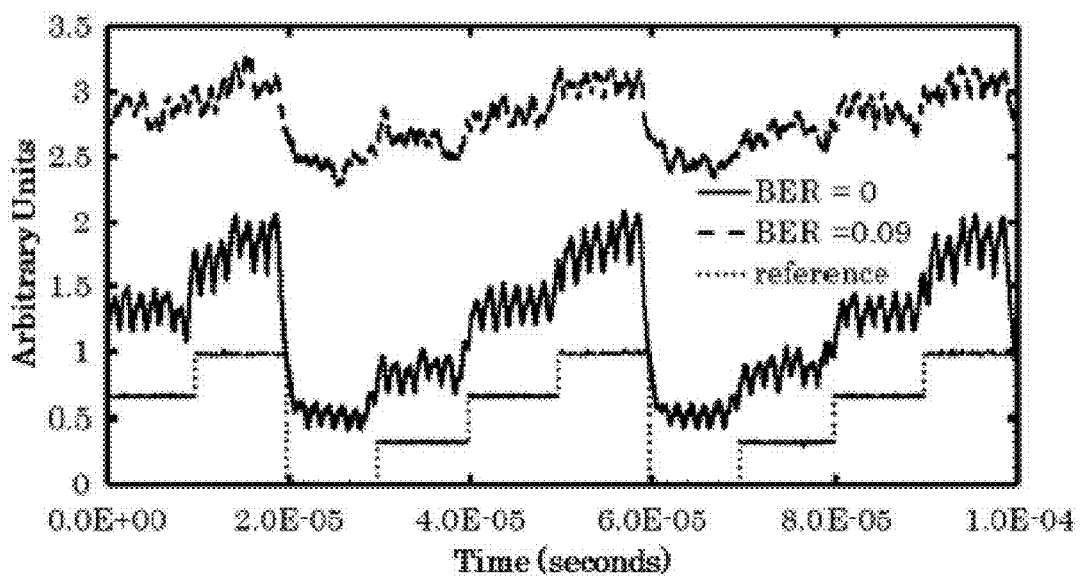
FIG. 6 is a plot comparing the bit-error-rate over time under various background levels and a reference.

FIG. 6 shows a polarization-modulated M=4 level signal with two different background levels, resulting in BER of 0-0.09 for sampling over 1000 pulses at 100 kHz with two background levels and one reference. For wavelength modulation, four separate lasers, each with a different wavelength—405, 465, 473, and 532 nm—were used with a 475-nm-cutoff filter. The cutoff filter resulted in transmission values of approximately 0, 0.2, 0.7, and 1.0. These relative transmissions were nearly the required 0, 0.33, 0.66, and 1.0 to obtain the four distinct outputs with a constant power input.

For M=4 wavelength modulation, the pulse energy multiplication factors were similar to those calculated for polarization modulation.

The estimated increase in energy per pulse at various M levels, found here experimentally at M=3 and 4 levels, was a conservative 4 and 8 times, respectively. The increase in pulse energy of higher M levels can be based on the fit to the values found in the literature, assuming a constant noise level and a 6 dB increase of energy/bit/noise with the following expression:

$$EMF = (\log_2 M) 4^{(\log_2 M - 1)} \quad (3)$$

In many embodiments, polarization and wavelength modulation rely on a constant energy per pulse at the transmitter, the average power is EMF multiplied by a factor of 2 times the energy required for binary modulation such as OOK. Therefore, an order of magnitude or larger increase in required transmitter power would likely result for M levels greater than 4. However, the polarization and wavelength components are measured separately and the DRM can be a factor of 4 or greater with minimal impact to required transmitter power.

For many of the modulation techniques described here, it is assumed that the total electrical power is the same for each combination of polarization or wavelength to maintain constant optical output power. However, each optical source output may not vary linearly with input power. In addition, the SWaP increase for rotational alignment of the polarization elements must be factored into a system. There is also a potential impact on system performance using these wavelength modulation techniques due to an increase of solar background where a narrow bandpass filter is precluded by the addition of multiple wavelengths incident on all detectors. A polarization detector would have to measure light across the entire spectrum of all combined wavelengths.

The added number of individual transmitter sources, associated modulators, polarization components, wavelength-dependent filters, and detectors will also increase the size of the transceivers. However, in comparison with a WDM approach, the number of detectors in the receiver could be significantly less. For example, a 4 bit/pulse WDM-based receiver would require four detectors. The same increase in data rate requires only two detectors in the receiver shown in FIG. 2. The wavelength dependence of the transmission of light through ocean water and the response of the detector will have an effect on the detection of wavelengths. Power levels for each wavelength source emitted by the transmitter would have to be adjusted based on known wavelength-dependent factors. It may also be necessary to adjust power based on a periodic calibration using a sequence of pulses with a known pattern of wavelengths. A wide variety of BG lasers and LEDs can be combined in an array that uses the polarization- and wavelength-modulation technique described here. Each type of light source will uniquely impact the ratio of increasing SWaP and DRM.

We discuss now the effect of water clarity on polarization modulation. Transmission of scattered light through ocean water as a function of water clarity was simulated using a water tube optical system filled with a Maalox® suspension. Estimates of transmission were made using the FRED® 3D ray tracing program (Photon Engineering®). The program uses a Henyey-Greenstein function for volume scattering, which is dependent on g, the average of the cosine of the scattering angle for the particle phase function. In these simulations, g=0.924, which indicates strong forward scattering and best approximates ocean-water scattering properties. Simulation input parameters for various concentrations of Maalox® were based on the calculated reflection loss from optics (windows, lenses) and the estimated values of the propagation loss, exp(−cL), where the length L is 2 m, and the total beam attenuation coefficient c is the sum of the absorption coefficient, a (1/m), and the scattering coefficient, b (1/m). Values for the coefficients were based on the following relationship with the concentration of Maalox® in water by volume, d:

$$c = c_o + a_d d^{1.00} + b_d d^{0.94} \quad (4)$$

where $c_o$ was the initial coefficient calculated, based on measurement without Maalox® added at the lowest FOV of 10 mrad. The absorption and scattering coefficients $a_d$ and $b_d$ and exponents of 1.00 and 0.94 were calculated based on a best fit with the measured data at the lowest FOV angle for various concentrations of Maalox®. The nearly linear relationship of absorption and scattering on the Maalox® concentration was based on the assumption that the relationship of beam attenuation coefficients on chlorophyllous pigment concentration in ocean water might be similar. The estimates of transmission at various concentrations of Maalox® at FOV angles up to 100 mrad were verified empirically using an experimental layout as shown in FIG. 7.

Figure 7:
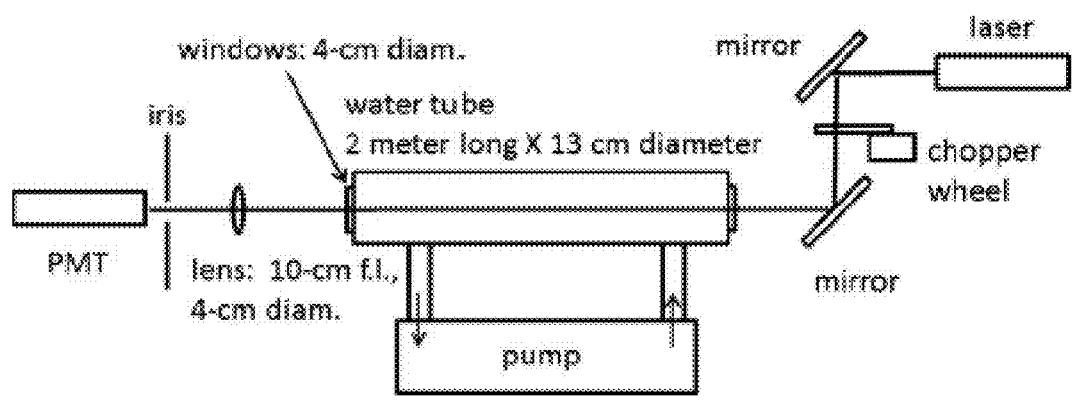
FIG. 7 is an illustration of a water tube layout.

FIG. 7 is an illustration of an experimental water tube layout used to test the method 10. There were two 4-cm-diameter windows, one on each end of the 2 m long water tube. The inside walls of the tube were lined with black felt to minimize reflections off of the black ABS material that contained the water/Maalox® mixture. A 10% solution of Maalox® was added to 22 l of water in a tube that was connected to a pump. A chopper wheel and lock-in amplifier were used to minimize the effects of ambient light. A pump circulated the water for 5 min between each addition of Maalox®.

FIG. 8A shows the extinction length at different FOV angles of a 515 nm wavelength collimated laser beam through the water tube and 10 cm focal-length lens with an adjustable iris at the front of the detector to measure various FOV angles for each Maalox® concentration. Extinction length is defined here as the propagation distance multiplied by the attenuation coefficient. The initial transmission through the water tube was 0.65 extinction lengths. The attenuation was larger than expected and may be due to a small concentration of Maalox® remaining in the tube from previous experiments. The initial 22 liters of water was obtained from a reverse-osmosis supply. The highest concentration of Maalox®, 2.7 ml added, resulted in 14 extinction lengths, where the majority of the measured and estimated transmissions at the exit of the water tube were at angles larger than 10 mrad. The extinction length as a function of FOV is represented by data points at various concentrations of Maalox®, and estimated extinction lengths based on ray-tracing software are given as solid lines.

FIGS. 8B and 8C are plots of the extinction length at different FOV angles for the lowest (0.00×10-5) and the highest (12.27×10-5) Maalox® concentrations. The discrepancy between the estimated and measured transmissions at higher concentrations of Maalox® and higher FOV may be due to the limitations of the ray-tracing software. The Henyey-Greenstein function may be a good approximation for natural water when performing computer simulation. Likewise, Maalox® may be a good approximation for natural water when performing laboratory experiments. However, the Henyey-Greenstein function may not be an adequate approximation for Maalox® particle scattering. In addition, the discrepancy at higher FOV may be due to the approximation of the scattering coefficient obtained using the best fit with data at low FOV. The degree of polarization was measured at 10 and 100 mrad FOV angles by taking the difference of transmission through a linear polarizer in copolarization and cross-polarization orientations and dividing by the sum. Measured extinction length as a function of FOV is represented by data points with no Maalox® added is shown in FIG. 8B. A Maalox® concentration of $12.27 \times 10^{-5}$ is shown in FIG. 8C. Estimated extinction lengths based on ray-tracing software are given as solid lines in both FIGS. 8B and 8C.

Figure 9:
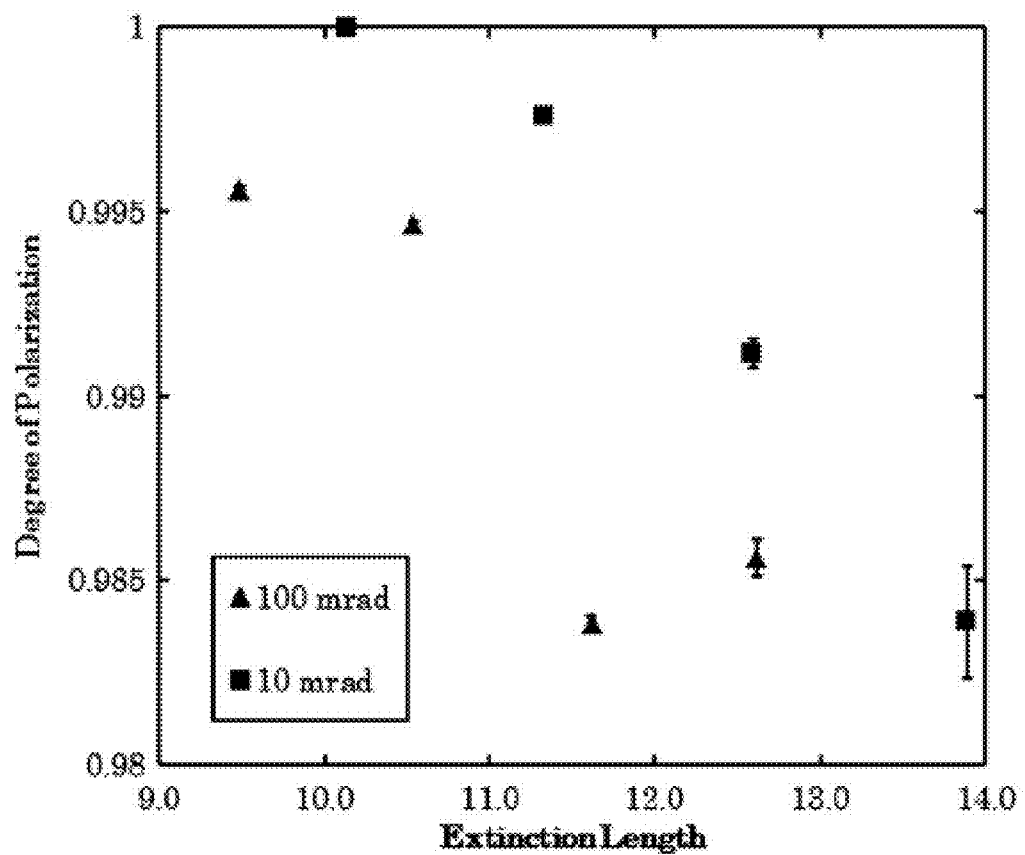
FIG. 9 is a plot of the extinction length at various degrees of polarization.

FIG. 9 is a plot of the degree of polarization (DOP) at 10 and 100 mrad FOV for various extinction lengths. A small amount (<2%) of depolarization for high attenuation values (caused by scattering) is shown in FIG. 9. Depolarization is expected to increase at higher extinction lengths. Therefore, it would appear that a negligible amount of polarization "noise" should not affect the BER for MPAM-level signals produced by polarization modulation through several attenuation lengths of scattered medium with FOV out to 100 mrad.

Method 10 is an undersea laser communications method using various polarization and wavelength modulation techniques that may use a combination of direct amplitude modulated semiconductor lasers, external polarization optics, and high-speed detectors. In one embodiment of method 10, the transmitter consisted of a laser source that was either polarized state modulated, wavelength modulated, or both. The pulse modulation rate was lower than the data rate as there was greater than 1 bit per pulse. A detector(s) with polarizing element(s) in front of the detector(s) was used to determine the polarization "state" of light. A separate detector(s) with filter(s) in front of the detector(s) was used to determine the wavelength of light. Propagation modeling determined the effect of the water channel on the distribution of power as a function of the receiver FOV. If the transmitter operates with powers exceeding those required for a minimum SNR, the transmitter source(s) can be wavelength and/or polarization state modulated. In this way, the combined modulation can provide discrete steps in the amplitude of the received signal from the detector(s) that can be differentiated into the four Stokes parameters and/or wavelength necessary to obtain multiple combinations, M, for each pulse resulting in a data rate of $B \log_2 M$, where B is the laser/detector pulse bandwidth.

DRM can be achieved through several techniques. Multiplexing of N simultaneous channels results in a DRM of N. These channels can be separated by wavelength, such as in WDM, using N laser sources and N detectors with a different filter placed in front of each associated detector. For optical communications using fiber or air as a medium, the wavelengths can be separated with fiber optic couplers. However, coupling light into a fiber is a challenge for free space laser communication in ocean water. The channels can also be separated using two orthogonal polarization states with different polarizing elements in front of each associated detector for a maximum DRM of 2. The data rate can be multiplied using multiple digital time positions or amplitudes for each pulse. Time position modulation such as PPM decreases the overall system data rate for systems that are limited to a minimum pulse width due to response times of the transmitting light source or detector and associated electronics.

In contrast, digital amplitude modulation or MPAM or MASK can significantly increase the data rate in a single channel by DRM=$\log_2 M$, where M is the number of discrete levels. A combination of WDM and MPAM will result in DRM=$N \log_2 M$. There is a power penalty associated with MPAM in that the energy per pulse must be greater than binary pulses, such as OOK, where M=2.

Figure 10A:
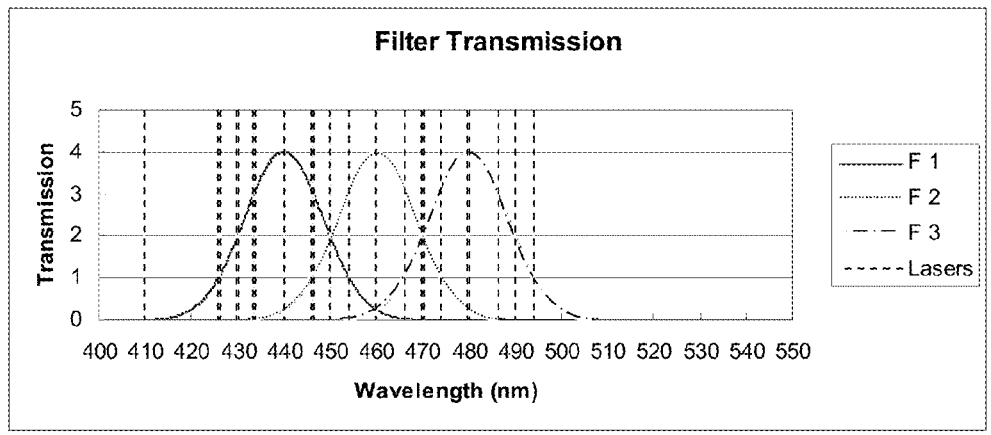
FIG. 10A is a plot of optical filter transmission.
Figure 10B:
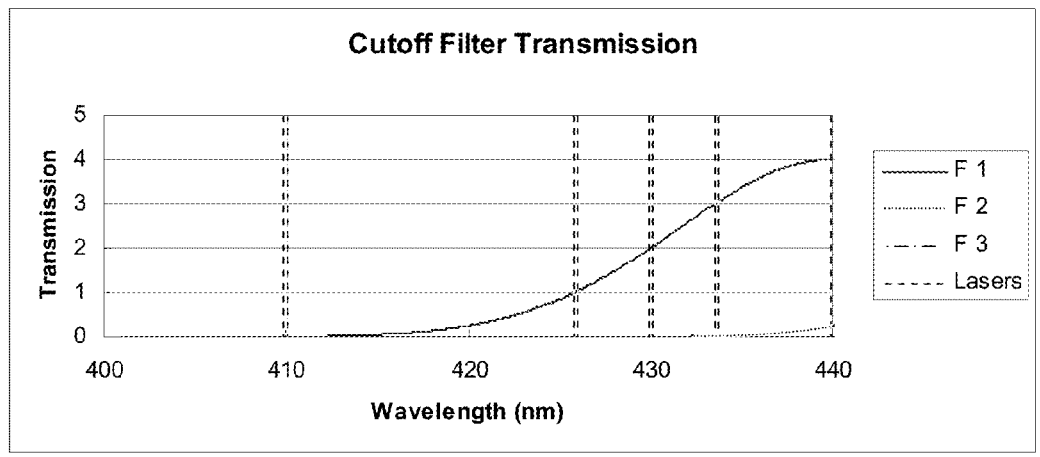
FIG. 10B is a plot of single cutoff filter transmission.

FIG. 10A is a plot of optical filter transmission wavelength modulation, M=5. Wavelength modulation differs from WDM in that there is only one channel with one wavelength per pulse. The wavelength information is obtained by a detector(s) with an associated optical filter(s) with a wavelength-dependent transmission where each wavelength results in a discrete measured amplitude. FIG. 10A shows three detectors, each with a wavelength-dependent Gaussian profile transmission, measuring five levels (M=5). Multiple detectors can distinguish between W different wavelengths, where W=(D+1)(M−1), where D is the number of detectors if D is greater than 2. For a single detector the value of W is equal to M. FIG. 10B is a plot of single cutoff filter transmission with wavelength modulation, M=5. FIG. 10B shows a single cutoff filter in front of a detector with five levels. For wavelength modulation, the increase in data rate is similar to MPAM, $DRM=\log_2 W$.

Figure 11A:
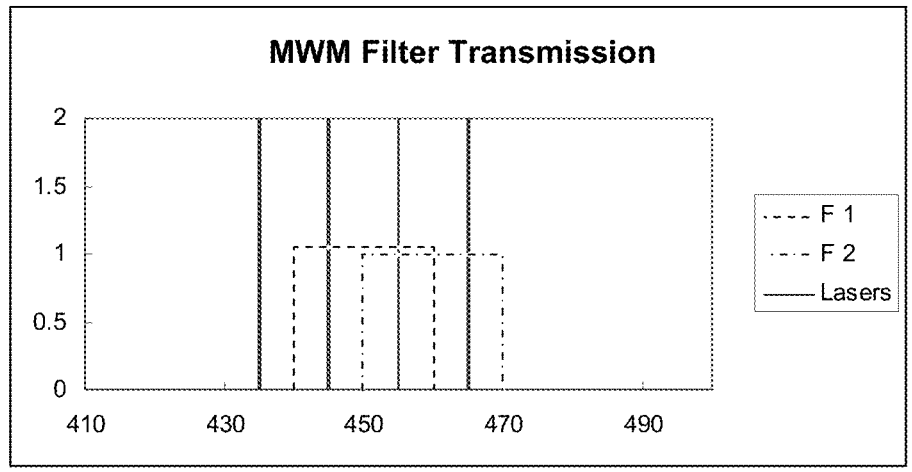
FIG. 11A is a plot showing the transmission of two bandpass filters, each placed in front of separate detectors.

Another modulation technique using mixed wavelengths (referred to hereafter as mixed wavelength modulation or MWM) employs the use of at least two detectors where each pulse is composed of one or more wavelengths at various energy levels while maintaining a constant total pulse energy. FIG. 11A shows the transmission of two bandpass filters, each placed in front of separate detectors. The first filter has a maximum transmission at wavelengths #2 and #3 and a minimum (near zero) transmission at wavelengths #1 and #4. The second filter has a maximum transmission at wavelengths #3 and #4 and a minimum (near zero) transmission at wavelengths #1 and #2. By adjusting the output power of the lasers operating at the four wavelengths from 0 to a maximum output in M number of steps, the number of combinations of discrete amplitude values measured is M squared ($M^2$). Here $DRM=\log_2 M^2$.

Table 1 lists the various amplitudes of each wavelength from 0 to a maximum value of 3 for four levels (M=4) and the measured power level in each detector yielding 16 ($M^2$) combinations.

TABLE 1

Two detector MWM combinations for M = 4.

| Laser Power Total | Laser Power W1 | Laser Power W2 | Laser Power W3 | Laser Power W4 | Detected Power D1 | Detected Power D2 |
|---|---|---|---|---|---|---|
| 3 | 3 | 0 | 0 | 0 | 0 | 0 |
| 3 | 2 | 0 | 0 | 1 | 0 | 1 |
| 3 | 1 | 0 | 0 | 2 | 0 | 2 |
| 3 | 0 | 0 | 0 | 3 | 0 | 3 |
| 3 | 2 | 1 | 0 | 0 | 1 | 0 |
| 3 | 2 | 0 | 1 | 0 | 1 | 1 |
| 3 | 1 | 0 | 1 | 1 | 1 | 2 |
| 3 | 0 | 0 | 1 | 2 | 1 | 3 |
| 3 | 1 | 2 | 0 | 0 | 2 | 0 |
| 3 | 1 | 1 | 1 | 0 | 2 | 1 |
| 3 | 1 | 0 | 2 | 0 | 2 | 2 |
| 3 | 0 | 0 | 2 | 1 | 2 | 3 |
| 3 | 0 | 3 | 0 | 0 | 3 | 0 |
| 3 | 0 | 2 | 1 | 0 | 3 | 1 |
| 3 | 0 | 1 | 2 | 0 | 3 | 2 |
| 3 | 0 | 0 | 3 | 0 | 3 | 3 |

If the number of detectors is three or more, then the associated filters must have multiple bands. Multi-bandpass filters have been manufactured for various applications.

Figure 11B:
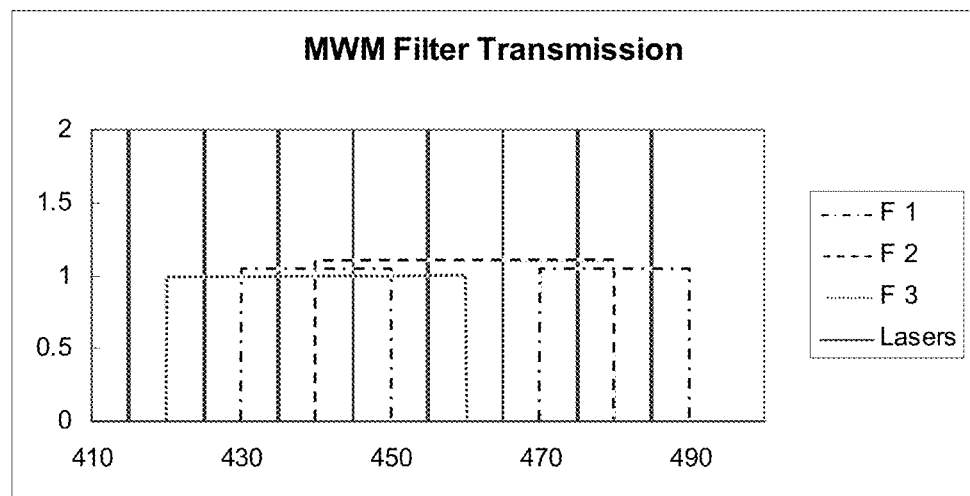
FIG. 11B is a plot showing the transmission of three filters.

FIG. 11B shows a sample set of three filters, yielding a $DRM=\log_2 M^3$ for MWM. The 27 combinations for three levels (M=3) are listed in Table 2.

TABLE 2

Three-detector MWM combinations for M = 3.

| Laser Power Total | Laser Power W1 | Laser Power W2 | Laser Power W3 | Laser Power W4 | Laser Power W5 | Laser Power W6 | Laser Power W7 | Laser Power W8 | Detected Power D1 | Detected Power D2 | Detected Power D3 |
|---|---|---|---|---|---|---|---|---|---|---|---|
| 2 | 2 | 0 | 0 | 0 | 0 | 0 | 0 | 0 | 0 | 0 | 0 |
| 2 | 1 | 1 | 0 | 0 | 0 | 0 | 0 | 0 | 0 | 0 | 1 |
| 2 | 0 | 2 | 0 | 0 | 0 | 0 | 0 | 0 | 0 | 0 | 2 |
| 2 | 1 | 0 | 0 | 0 | 0 | 1 | 0 | 0 | 0 | 1 | 0 |
| 2 | 1 | 0 | 0 | 0 | 1 | 0 | 0 | 0 | 0 | 1 | 1 |
| 2 | 0 | 1 | 0 | 0 | 1 | 0 | 0 | 0 | 0 | 1 | 2 |
| 2 | 0 | 0 | 0 | 0 | 0 | 2 | 0 | 0 | 0 | 2 | 0 |
| 2 | 0 | 0 | 0 | 0 | 1 | 1 | 0 | 0 | 0 | 2 | 1 |
| 2 | 0 | 0 | 0 | 0 | 2 | 0 | 0 | 0 | 0 | 2 | 2 |
| 2 | 1 | 0 | 0 | 0 | 0 | 0 | 1 | 0 | 1 | 0 | 0 |
| 2 | 1 | 0 | 1 | 0 | 0 | 0 | 0 | 0 | 1 | 0 | 1 |
| 2 | 0 | 1 | 1 | 0 | 0 | 0 | 0 | 0 | 1 | 0 | 2 |
| 2 | 1 | 0 | 0 | 0 | 0 | 1 | 0 | 1 | 1 | 1 | 0 |
| 2 | 1 | 0 | 0 | 1 | 0 | 0 | 0 | 0 | 1 | 1 | 1 |
| 2 | 0 | 1 | 0 | 1 | 0 | 0 | 0 | 0 | 1 | 1 | 2 |
| 2 | 0 | 0 | 0 | 0 | 0 | 1 | 1 | 0 | 1 | 2 | 0 |
| 2 | 0 | 0 | 0 | 1 | 0 | 1 | 0 | 0 | 1 | 2 | 1 |
| 2 | 0 | 0 | 0 | 1 | 1 | 0 | 0 | 0 | 1 | 2 | 2 |
| 2 | 0 | 0 | 0 | 0 | 0 | 0 | 2 | 2 | 0 | 0 | 0 |
| 2 | 0 | 0 | 1 | 0 | 0 | 0 | 0 | 1 | 2 | 0 | 1 |
| 2 | 0 | 0 | 2 | 0 | 0 | 0 | 0 | 0 | 2 | 0 | 2 |
| 2 | 0 | 0 | 0 | 0 | 0 | 0 | 1 | 1 | 2 | 1 | 0 |
| 2 | 0 | 0 | 0 | 1 | 0 | 0 | 0 | 1 | 2 | 1 | 1 |
| 2 | 0 | 0 | 1 | 1 | 0 | 0 | 0 | 0 | 2 | 1 | 2 |
| 2 | 0 | 0 | 0 | 0 | 0 | 2 | 0 | 2 | 2 | 0 | |
| 2 | 0 | 0 | 0 | 1 | 0 | 1 | 0 | 2 | 2 | 1 | |
| 2 | 0 | 0 | 0 | 2 | 0 | 0 | 0 | 0 | 2 | 2 | 2 |

Figure 12:
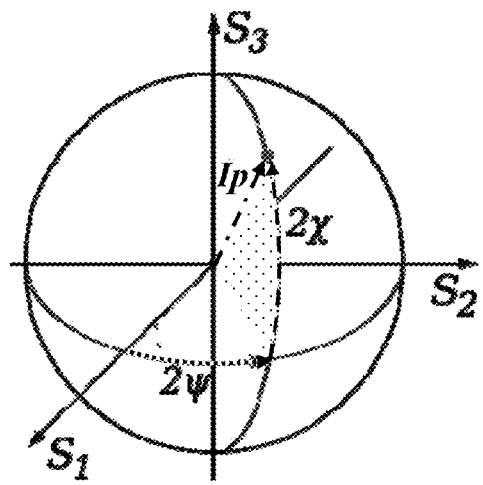
FIG. 12 is an illustration of a Poincaré sphere and associated Stokes parameters.

FIG. 12 shows polarization states represented by the four Stokes parameters that can be mapped on to a Poincaré sphere. Polarization modulation differs from orthogonal polarization channel multiplexing in that there is only one channel with one polarization state per pulse. The polarization state information is obtained by a detector(s) with an associated polarization element(s) with a polarization-dependent transmission where each polarization state results in a discrete measured amplitude.

Figure 13A:
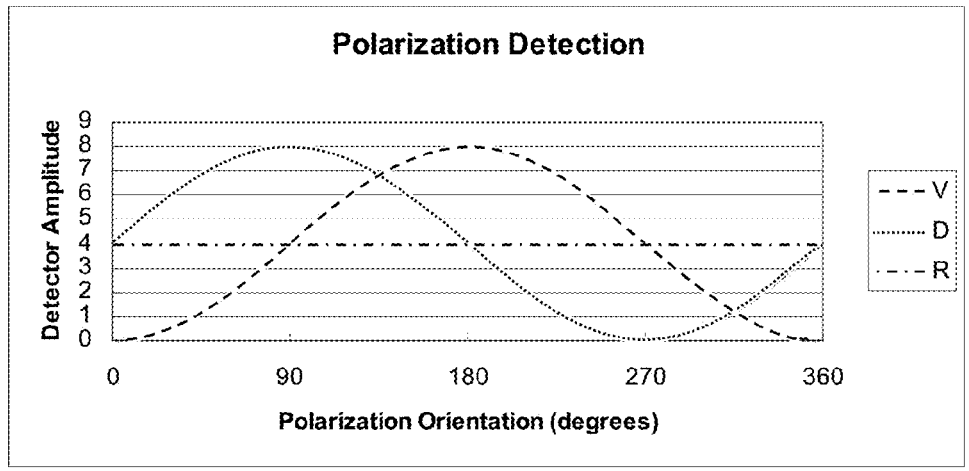
FIGS. 13A-13B are plots of detector amplitude vs. polarization orientation with transmission through three polarizing elements.
Figure 13B:
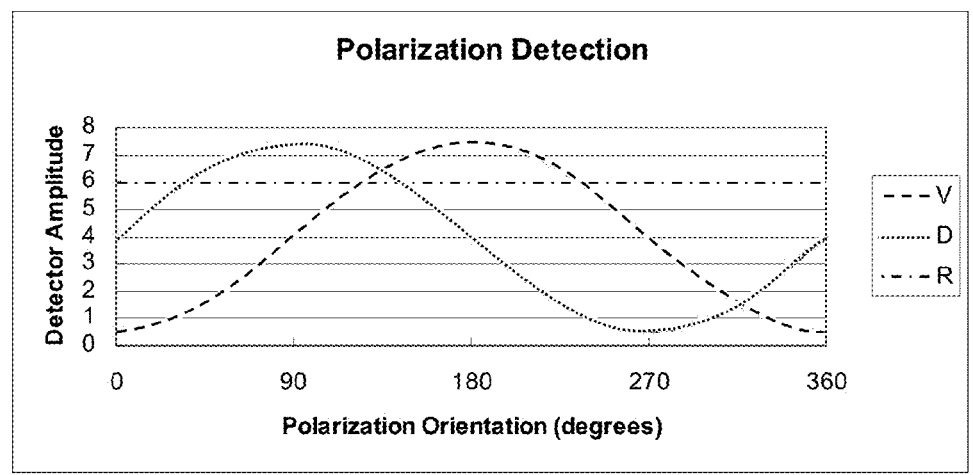

FIGS. 13A-13B are plots of detector amplitude vs. polarization orientation with transmission through three polarizing elements for $\chi=0$ and $\chi>0$ respectively. FIGS. 13A-13B represent one example of measurements using three detectors with associated polarizing elements, a vertically oriented linear polarizer, V, a diagonal or 45-degree oriented linear polarizer, D, and a quarter wave plate followed by a linear polarizer with the fast axis of the plate oriented at a 45-degree angle, resulting in a maximum transmission of right circularly polarized light, R.

$$V=(I/2)(S_0-S_1)=(I/2)(1-\cos 2\psi \cos 2\chi)$$

$$D=(I/2)(S_0+S_2)=(I/2)(1+\sin 2\psi \cos 2\chi)$$

$$R=(I/2)(S_0+S_3)=(I/2)(1+\sin 2\chi)$$

The data rate increases by $DRM=\log_2 P$, where P is the number of discrete polarization states measured by the detector(s). There is no direct mathematical representation for the relationship between the number of detectors, number of amplitude levels, M, and polarization states, P. However, for a single detector, P=M. In addition, three detectors is the maximum number to determine all Stokes parameters, normalized to the intensity or first Stokes parameter, $S_0$. A combination of wavelength and polarization modulation, where each pulse has a distinct polarization state and wavelength, will yield a data rate increase of $DRM=\log_2(WP)$.

Figure 14:
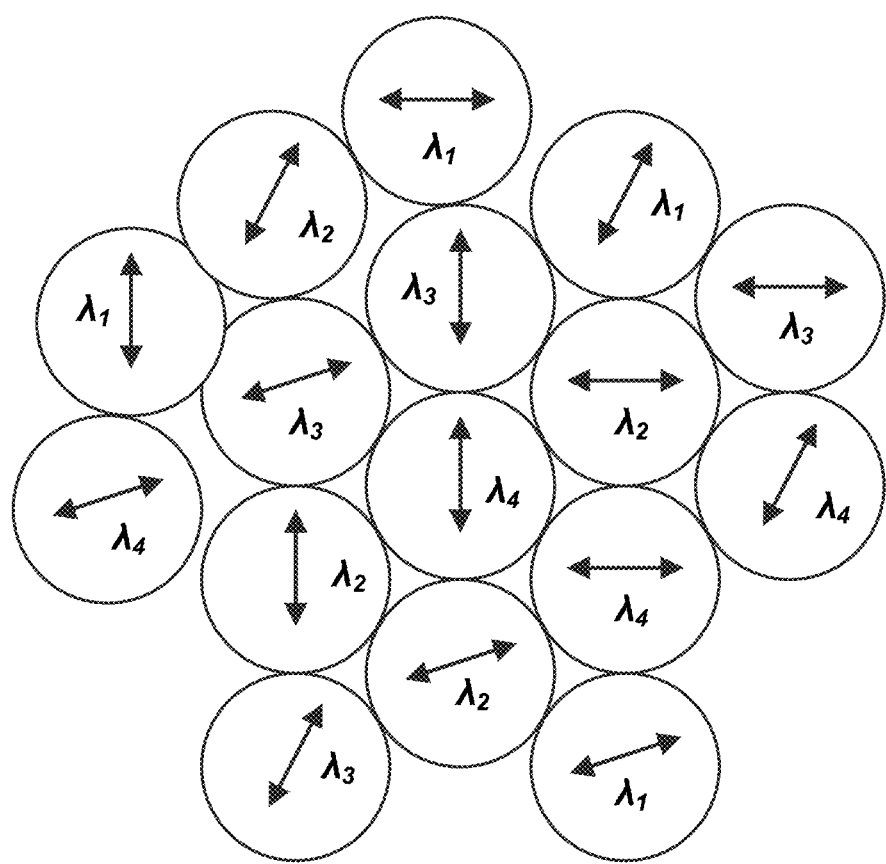
FIG. 14 is an illustration of an embodiment of a laser diode array.

FIG. 14 is an illustration of a laser diode array. A combination of MWM and polarization, where the amplitude of different wavelength sources is mixed with a constant polarization state and pulse energy for each pulse, will yield a data rate increase of $DRM=\log_2 PM^D$, where D is the number of MWM detectors. For a four-level system, a single polarization detector and two MWM detectors will yield a 6× increase in data rate. This can be accomplished with an array of 16 laser diodes (4 wavelengths and 4 polarizing elements). FIG. 14 shows an array of 16 laser diodes for the 6× increase in data rate capability.

Figure 15A:
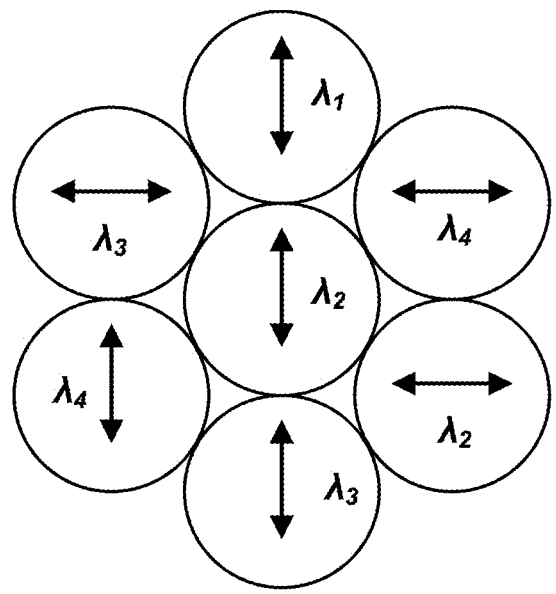
FIG. 15A is an illustration of an embodiment of a laser diode array.
Figure 15B:
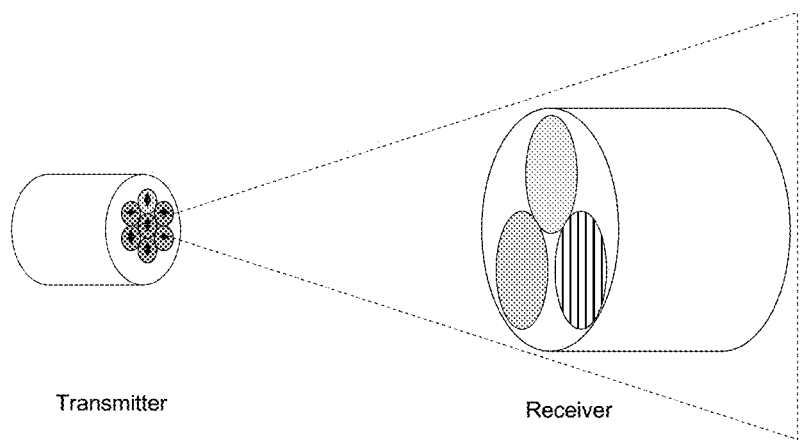
FIG. 15B is an illustration of a communications system.

FIG. 15A shows an array of seven laser diodes (two orthogonal polarization states, four wavelengths) for the same 6× increase in data rate capability. In addition to the previously mentioned combinations, a combination of mixed orthogonal polarization (MOP), and MWM can reduce the number of required laser diodes. Table 3 lists the 64 combinations from seven laser sources, four wavelengths, and two orthogonal polarization states. The horizontal polarized component of wavelength $\lambda_1$ is not required. The intensity of the wavelength and polarization components varies but with a maximum energy per pulse. In this case, the maximum energy is not constant. In the specific case of M=4 levels, the duty factor is reduced to about 81%, thus further reducing the operating power. FIG. 15B shows a one-way link using an array consisting of a seven-laser diode transmitter and a three-detector receiver.

TABLE 3

Sixty-four combinations (6 bits per pulse) with MOP and MWM combination.
Mixed Polarization/Mixed Wavelength Modulation

| Laser Power Total | Laser Power W1 V pol. | Laser Power W2 H pol. | Laser Power W2 V pol. | Laser Power W3 H pol. | Laser Power W3 V pol. | Laser Power W4 H pol. | Laser Power W4 V pol. | Detected Power D1 V Pol. | Detected Power D2 W2 + W3 | Detected Power D3 W3 + W4 |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 1 | 0 | 0 | 0 | 1 |
| 2 | 0 | 0 | 0 | 0 | 0 | 2 | 0 | 0 | 0 | 2 |
| 3 | 0 | 0 | 0 | 0 | 0 | 3 | 0 | 0 | 0 | 3 |
| 1 | 0 | 1 | 0 | 0 | 0 | 0 | 0 | 0 | 1 | 0 |
| 1 | 0 | 0 | 0 | 1 | 0 | 0 | 0 | 0 | 1 | 1 |
| 2 | 0 | 0 | 0 | 1 | 0 | 1 | 0 | 0 | 1 | 2 |
| 3 | 0 | 0 | 0 | 1 | 0 | 2 | 0 | 0 | 1 | 3 |
| 2 | 0 | 2 | 0 | 0 | 0 | 0 | 0 | 0 | 2 | 0 |
| 2 | 0 | 1 | 0 | 1 | 0 | 0 | 0 | 0 | 2 | 1 |
| 2 | 0 | 0 | 0 | 2 | 0 | 0 | 0 | 0 | 2 | 2 |
| 3 | 0 | 0 | 0 | 2 | 0 | 1 | 0 | 0 | 2 | 3 |
| 3 | 0 | 3 | 0 | 0 | 0 | 0 | 0 | 0 | 3 | 0 |
| 3 | 0 | 2 | 0 | 1 | 0 | 0 | 0 | 0 | 3 | 1 |
| 3 | 0 | 1 | 0 | 2 | 0 | 0 | 0 | 0 | 3 | 2 |
| 3 | 0 | 0 | 0 | 3 | 0 | 0 | 0 | 0 | 3 | 3 |
| 1 | 1 | 0 | 0 | 0 | 0 | 0 | 0 | 1 | 0 | 0 |
| 1 | 0 | 0 | 0 | 0 | 0 | 0 | 1 | 1 | 0 | 1 |
| 2 | 0 | 0 | 0 | 0 | 1 | 1 | 0 | 1 | 0 | 2 |
| 3 | 0 | 0 | 0 | 0 | 2 | 1 | 0 | 1 | 0 | 3 |
| 1 | 0 | 0 | 1 | 0 | 0 | 0 | 0 | 1 | 1 | 0 |
| 1 | 0 | 0 | 0 | 0 | 1 | 0 | 0 | 1 | 1 | 1 |
| 2 | 0 | 0 | 0 | 1 | 1 | 0 | 0 | 1 | 1 | 2 |
| 3 | 0 | 0 | 0 | 1 | 2 | 0 | 0 | 1 | 1 | 3 |
| 2 | 0 | 1 | 1 | 0 | 0 | 0 | 0 | 1 | 2 | 0 |
| 2 | 0 | 1 | 0 | 0 | 1 | 0 | 0 | 1 | 2 | 1 |
| 2 | 0 | 0 | 1 | 1 | 0 | 0 | 0 | 1 | 2 | 2 |
| 3 | 0 | 0 | 0 | 1 | 1 | 1 | 0 | 1 | 2 | 3 |
| 3 | 0 | 2 | 1 | 0 | 0 | 0 | 0 | 1 | 3 | 0 |
| 3 | 0 | 2 | 0 | 0 | 1 | 0 | 0 | 1 | 3 | 1 |
| 3 | 0 | 1 | 0 | 1 | 1 | 0 | 0 | 1 | 3 | 2 |
| 3 | 0 | 0 | 0 | 2 | 1 | 0 | 0 | 1 | 3 | 3 |

TABLE 3-continued

Sixty-four combinations (6 bits per pulse) with MOP and MWM combination.
Mixed Polarization/Mixed Wavelength Modulation

| Laser Power Total | Laser Power W1 V pol. | Laser Power W2 H pol. | Laser Power W2 V pol. | Laser Power W3 H pol. | Laser Power W3 V pol. | Laser Power W4 H pol. | Laser Power W4 V pol. | Detected Power D1 V Pol. | Detected Power D2 W2 + W3 | Detected Power D3 W3 + W4 |
|---|---|---|---|---|---|---|---|---|---|---|
| 2 | 2 | 0 | 0 | 0 | 0 | 0 | 0 | 2 | 0 | 0 |
| 2 | 1 | 0 | 0 | 0 | 0 | 0 | 1 | 2 | 0 | 1 |
| 2 | 0 | 0 | 0 | 0 | 0 | 0 | 2 | 2 | 0 | 2 |
| 3 | 0 | 0 | 0 | 0 | 0 | 1 | 2 | 2 | 0 | 3 |
| 2 | 1 | 0 | 1 | 0 | 0 | 0 | 0 | 2 | 1 | 0 |
| 2 | 1 | 0 | 0 | 0 | 1 | 0 | 0 | 2 | 1 | 1 |
| 2 | 0 | 0 | 0 | 0 | 1 | 0 | 1 | 2 | 1 | 2 |
| 3 | 0 | 0 | 0 | 0 | 1 | 1 | 1 | 2 | 1 | 3 |
| 2 | 0 | 0 | 2 | 0 | 0 | 0 | 0 | 2 | 2 | 0 |
| 2 | 0 | 0 | 1 | 0 | 1 | 0 | 0 | 2 | 2 | 1 |
| 2 | 0 | 0 | 0 | 0 | 2 | 0 | 0 | 2 | 2 | 2 |
| 3 | 0 | 0 | 0 | 0 | 2 | 1 | 0 | 2 | 2 | 3 |
| 3 | 0 | 1 | 2 | 0 | 0 | 0 | 0 | 2 | 3 | 0 |
| 3 | 0 | 0 | 2 | 1 | 0 | 0 | 0 | 2 | 3 | 1 |
| 3 | 0 | 1 | 0 | 0 | 2 | 0 | 0 | 2 | 3 | 2 |
| 3 | 0 | 0 | 0 | 1 | 2 | 0 | 0 | 2 | 3 | 3 |
| 3 | 3 | 0 | 0 | 0 | 0 | 0 | 0 | 3 | 0 | 0 |
| 3 | 2 | 0 | 0 | 0 | 0 | 0 | 1 | 3 | 0 | 1 |
| 3 | 1 | 0 | 0 | 0 | 0 | 0 | 2 | 3 | 0 | 2 |
| 3 | 0 | 0 | 0 | 0 | 0 | 0 | 3 | 3 | 0 | 3 |
| 3 | 2 | 0 | 1 | 0 | 0 | 0 | 0 | 3 | 1 | 0 |
| 3 | 2 | 0 | 0 | 0 | 1 | 0 | 0 | 3 | 1 | 1 |
| 3 | 1 | 0 | 0 | 0 | 1 | 0 | 1 | 3 | 1 | 2 |
| 3 | 0 | 0 | 0 | 0 | 1 | 0 | 2 | 3 | 1 | 3 |
| 3 | 1 | 0 | 2 | 0 | 0 | 0 | 0 | 3 | 2 | 0 |
| 3 | 1 | 0 | 1 | 0 | 1 | 0 | 0 | 3 | 2 | 1 |
| 3 | 1 | 0 | 0 | 0 | 2 | 0 | 0 | 3 | 2 | 2 |
| 3 | 0 | 0 | 0 | 0 | 2 | 0 | 1 | 3 | 2 | 3 |
| 3 | 0 | 0 | 3 | 0 | 0 | 0 | 0 | 3 | 3 | 0 |
| 3 | 0 | 0 | 2 | 0 | 1 | 0 | 0 | 3 | 3 | 1 |
| 3 | 0 | 0 | 1 | 0 | 2 | 0 | 0 | 3 | 3 | 2 |
| 3 | 0 | 0 | 0 | 0 | 3 | 0 | 0 | 3 | 3 | 3 |

An increase in SNR may be desirable for MPAM detection at M levels in excess of 2 (binary) in order to obtain the same BER performance relative to binary modulation such as OOK. Laboratory measurements of BER for MPAM levels of 2, 3 and 4 were made using one laser and four AOMs, each with a distinct polarization output (linear 0°, 33°, 55°, and 90° orientation) and equal pulse energy output. A white light lamp was used to simulate solar background, and a vertical linear polarizer was placed in front of a PMT detector. The power amplitude of the laser and lamp were varied using calibrated neutral density filters.

Figure 16A:
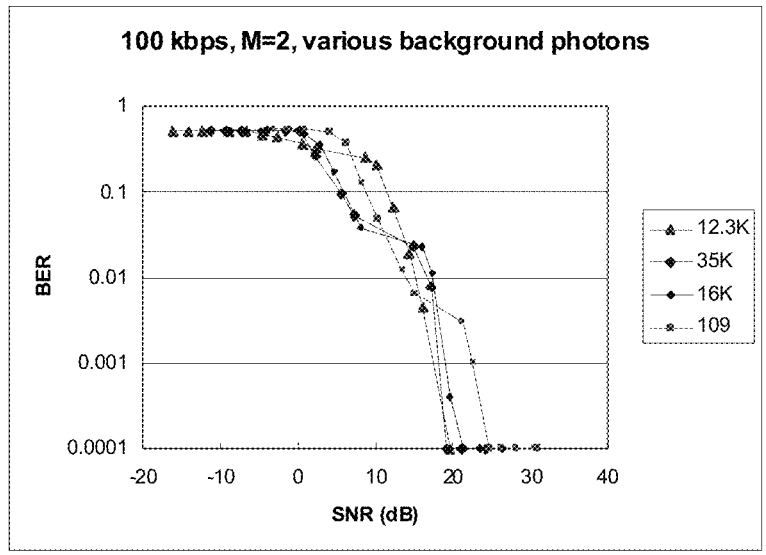
FIGS. 16A and 16B are plots of bit-error-rate values versus signal to noise ratios for various background photons.
Figure 16B:
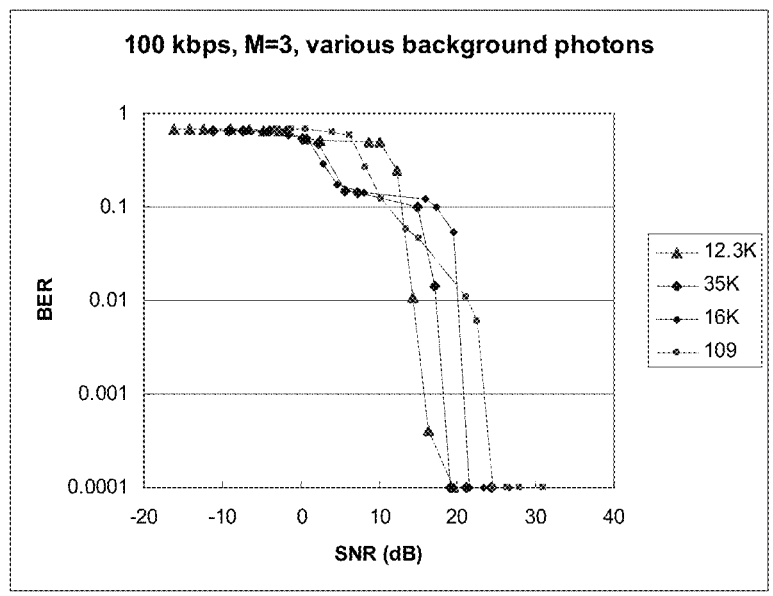

FIGS. 16A-16B are plots of BER vs. SNR for M=2 and M=3 respectively, which show the relationship between calculated SNR, based on the power measurements of the incident laser and lamp, and measured BER for different levels of M. The data indicate a similar BER is obtained with similar SNR at these lower M levels.

Figure 17A:
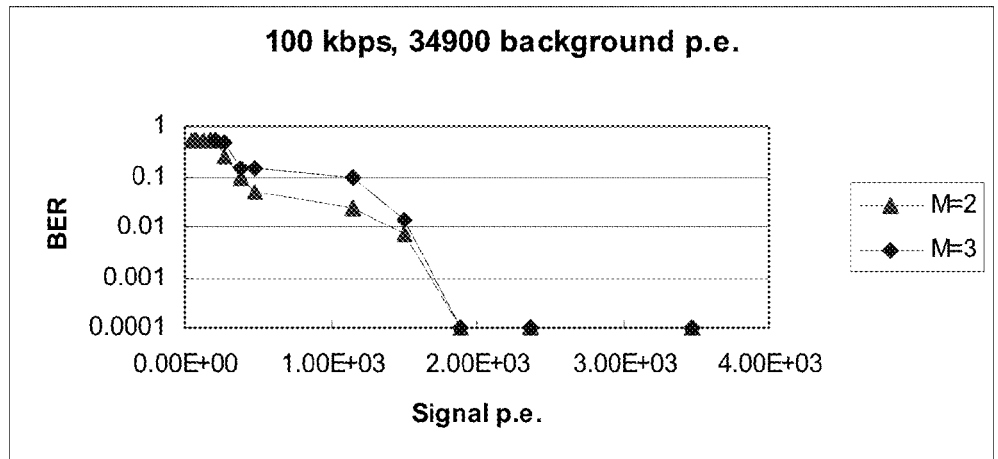
FIG. 17A is a plot of signal photoelectrons vs. BER for various M levels.

FIG. 17A is a plot of signal photoelectrons vs. BER for M=2 and 3. The increase in SWaP is a function of required pulse energy given the same minimum pulse width. The increase of photoelectrons or maximum pulse energy for the same BER was calculated for M=2, 3, and 4 with various background levels. A sample of the variance in the measurement for a large background level is shown in FIG. 17A. The variance between required pulse energy for M=2, 3, and 4 levels ranged from 0.6 to over 10. However, the average value of 3 to 4 and 7 to 8 times increase in pulse energy for M=3 and 4 values, respectively, relative to binary, M=2, case was obtained using a 532-nm wavelength (green) laser. This is consistent with the 4-dB to 6-dB increase in pulse energy per bit per noise found in the literature.

Figure 17B:
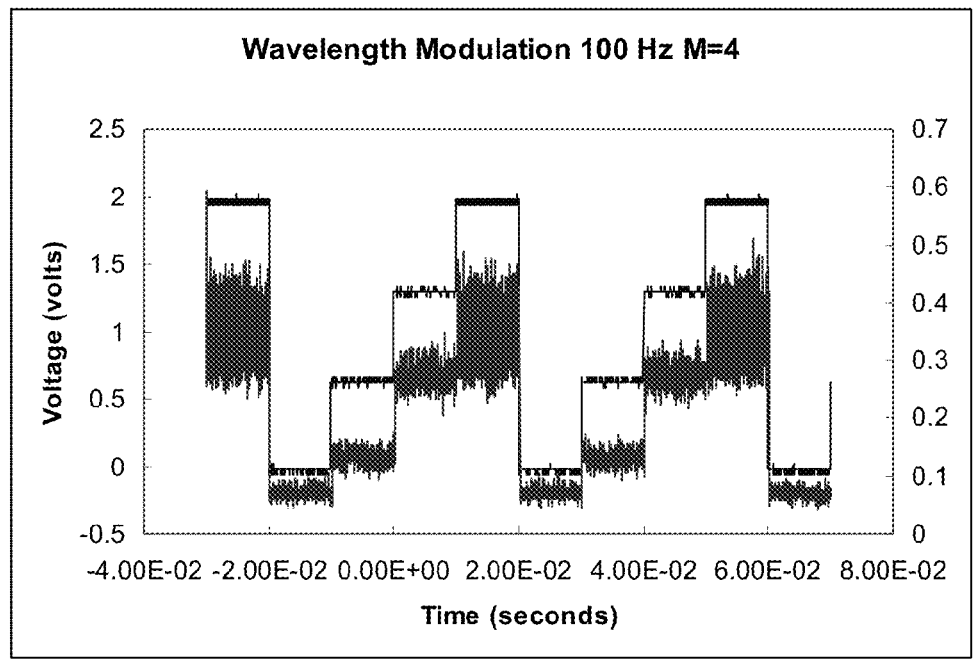
FIG. 17B is a plot of voltage vs. time showing a M=4 level modulated signal using wavelength modulation.

FIG. 17B is a plot of voltage vs. time showing a M=4 level modulated signal using wavelength modulation. For wavelength modulation, four separate lasers, each with a different wavelength (405, 465, 473, and 532 nm), were used with a 475-nm cutoff filter to obtain the four distinct outputs with a constant power input. The pulse energy multiplication factors were similar to those calculated for polarization modulation.

For MWM modulation techniques, it is assumed that the total electrical power is the same for each combination of wavelengths due to the constant optical output power. However, each laser diode may have a threshold current that can vary between 10% to 30% of the operating maximum current and the addition of threshold current may increase the overall power calculation.

There is also a potential impact on system performance using wavelength modulation and MWM techniques due to an increase of solar background where a narrow bandpass filter is precluded by the addition of multiple wavelengths incident on all detectors. A polarization detector would have to measure light across the entire spectrum of all combined wavelengths. A substitution of solid state crystal, fiber, and dye lasers for semiconductor (diode) lasers will impact the ratio of transmitter to transceiver SWaP ratios. However, the small volume and potential very high efficiency of diode lasers must be considered within a system-level design. Regardless, a wide variety of blue-green lasers and light emitting diodes can be combined in an array that uses the polarization and wavelength modulation technique described in this effort.

Figure 18A:
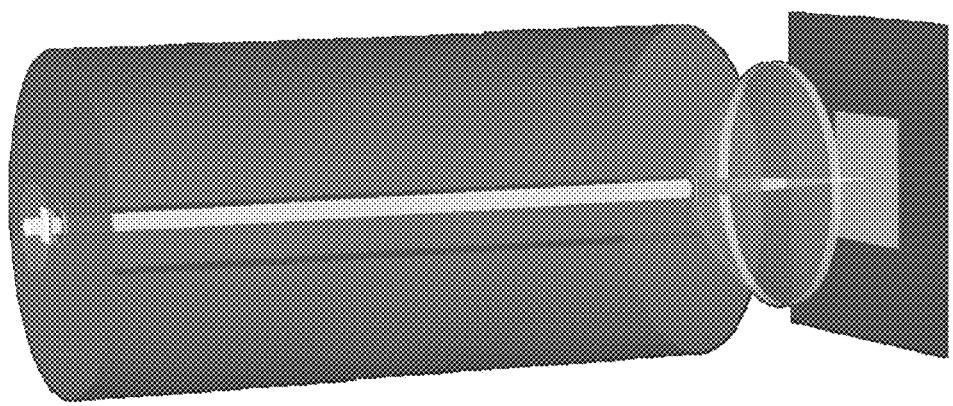
FIG. 18A is a ray tracing model illustration without scattering.
Figure 18B:
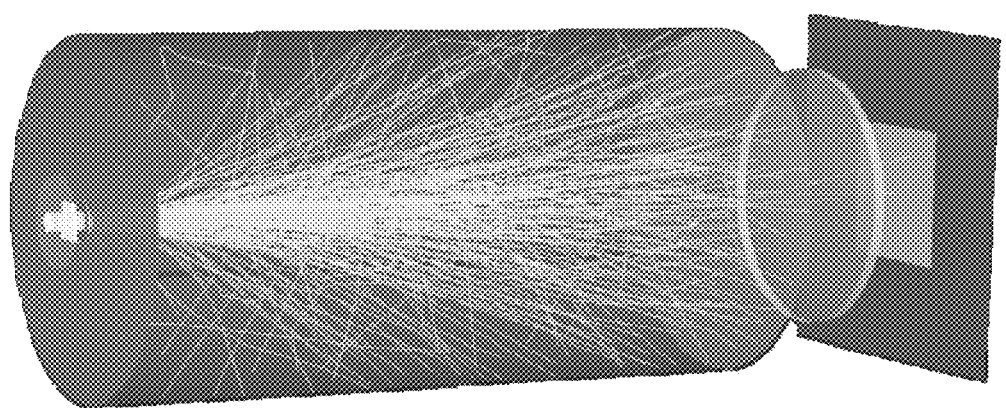
FIG. 18B is a ray tracing model illustration with scattering.

FIGS. 18A and 18B are respectively ray tracing (FRED) model illustration without and with scattering. Estimates of scattered light through ocean water as a function of water clarity were made using a ray tracing program. FIG. 18A shows the transmission of a collimated beam through pure water into a receiver consisting of a 10-centimeter focal length lens and a detector with a variable iris to adjust the FOV of the receiver from several hundred milliradians to less than 10 milliradians. FIG. 18B shows the transmission through water with added scattering.

Figure 19A:
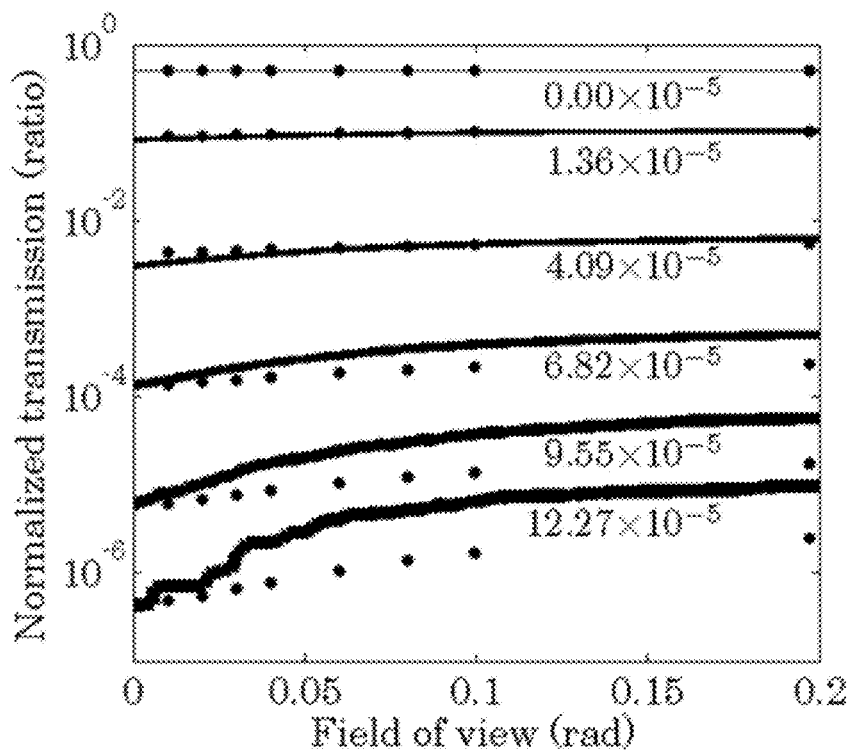
FIG. 19A is a plot of measured transmission (log scale) represented by data points at various concentrations of Maalox®.

FIG. 19A is a plot of measured transmission (log scale) represented by data points at various concentrations of Maalox®, and estimated transmission based on ray tracing software is given as solid lines. FIG. 19A shows the estimated (solid lines) transmission through water at various total attenuation lengths for narrow FOV angles. The estimates did not include losses from absorption as the goal was to predict the performance of scattering losses as a function of FOV. Note that over 50% of the light that is transmitted to the receiver plane is scattered out of the narrow FOV collimated beam with the extreme lower water clarity condition. The estimates were verified empirically using a 2-meter long, 10-cm diameter water tube filled with water and Maalox® to simulate scattering conditions in the ocean water. There were two 4-cm diameter windows, one on each end of the water tube. The inside walls of the tube were lined with black felt to minimize reflections off of the black ABS material that contained the water/Maalox® mixture. A 10% solution of Maalox® was added to the water tube that was connected to a pump. The pump ran for 5 minutes between each addition of Maalox®. FIG. 19A shows the transmission of a collimated laser beam, 515-nm wavelength, through the water tube and 100-cm focal length lens at various FOV angles and Maalox® concentrations (data points). Note the similarity between the estimated and measured scattered light ratio at high attenuation values.

Figure 19B:
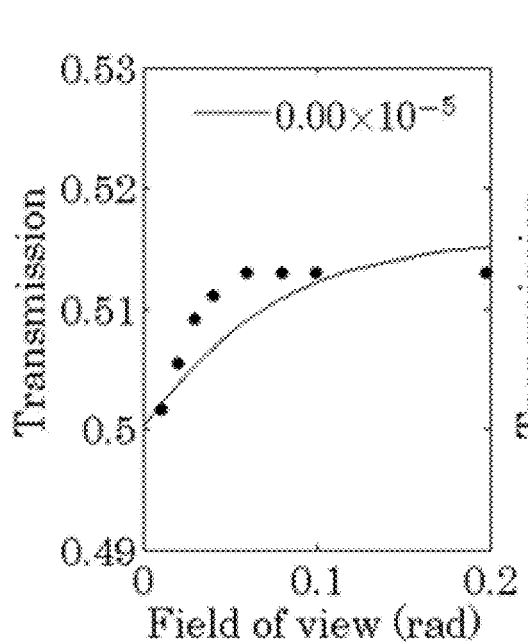
FIGS. 19B and 19C show linear plots of two levels of water clarity.
Figure 19C:
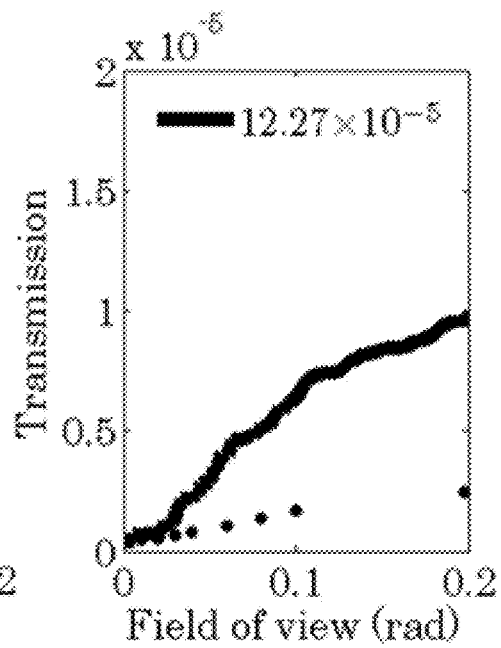

FIGS. 19B and 19C show linear plots of two extreme levels of water clarity. The degree of polarization was measured at 10- and 100-mrad FOV angles by taking the difference of transmission through a linear polarizer in a co- and cross-polarization orientation and dividing by the sum. Measured transmission (linear scale) is represented by data points with no Maalox® added (FIG. 19A) and with a Maalox® concentration of $12.27 \times 10^{-5}$. Estimated transmission based on ray tracing software is given as solid lines.

Figure 20:
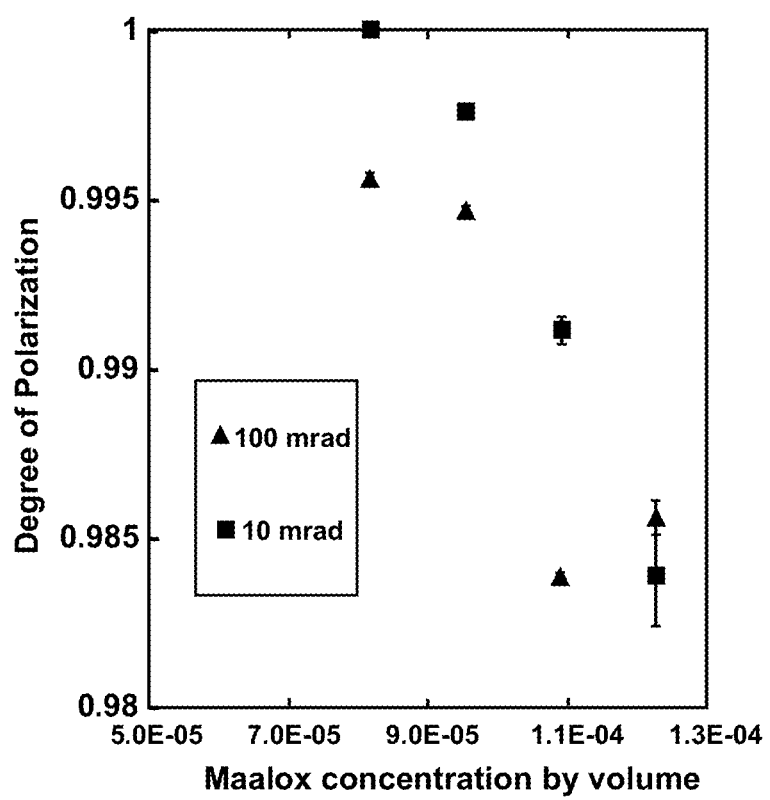
FIG. 20 is a plot showing the degree of polarization at 10 and 100 milliradians with variable Maalox® concentrations.

FIG. 20 is a plot showing the degree of polarization at 10 and 100 milliradians with variable Maalox® concentrations. A small amount of depolarization for high attenuation values due to scattering is shown in FIG. 20. Therefore, it would appear that a negligible amount of polarization "noise" should not affect the BER for MPAM level signals produced by polarization modulation through several attenuation lengths of scattered medium with FOV out to 100 milliradians.

From the above description of the System and method for communicating underwater, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A communications method comprising the following steps:
    emitting a series of pulses from a transmitter through water, wherein each pulse comprises a plurality of electromagnetic component signals, wherein each component signal has a fixed combination of wavelength and polarization state that differs from the wavelength and polarization state combinations corresponding to the other component signals, and wherein the wavelength of each component signal has a wavelength selected from a group of four wavelengths, all of which are in a blue-green region of an electromagnetic spectrum, and wherein each component signal has one of at least two different polarization states;
    encoding data onto each pulse by varying the amplitude of selected component signals of each pulse;
    receiving each pulse with a receiver; and
    retrieving the data by detecting the component signals based on the component signals' wavelength, polarization state, and amplitude.

2. The method of claim 1, wherein the transmitter comprises 16 laser diodes, and wherein each component signal has one of four polarization states.

3. The method of claim 1, wherein the transmitter comprises 7 laser diodes.

4. The method of claim 1, further comprising the step of sending periodic calibration pulses from the transmitter to the receiver.

5. A communications system comprising:
    a transmitter comprising a plurality of emitters, each emitter configured to emit an electromagnetic component signal that has a fixed combination of wavelength and polarization state that differs from the wavelength and polarization state combinations of the other component signals emitted from the other emitters, wherein the transmitter is configured to emit a series of pulses through water, wherein each pulse comprises a component signal at a given amplitude level from each of the plurality of emitters; and
    a receiver comprising first, second, and third detectors, wherein the first detector is configured to detect substantially only component signals in the first polarized state, wherein the second detector is configured to detect substantially only component signals having second and third wavelengths $\lambda_2$ and $\lambda_3$, and wherein the third detector is configured to detect substantially only component signals having third and fourth wavelengths $\lambda_3$ and $\lambda_4$.

6. The communications system of claim 5, wherein the plurality of emitters comprises:
    a first emitter configured to emit a first component signal at a first wavelength $\lambda_1$ and polarized in a first direction;
    a second emitter configured to emit a second component signal at a second wavelength $\lambda_2$ and polarized in a second direction, wherein the second direction is orthogonal to the first direction;
    a third emitter configured to emit a third component signal at the second wavelength $\lambda_2$ and polarized in the first direction;
    a fourth emitter configured to emit a fourth component signal at a third wavelength $\lambda_3$ and polarized in the second direction;
    a fifth emitter configured to emit a fifth component signal at the third wavelength $\lambda_3$ and polarized in the first direction;

a sixth emitter configured to emit a sixth component signal at a fourth wavelength $\lambda_4$ and polarized in the second direction; and a seventh emitter configured to emit a seventh component signal at the fourth wavelength $\lambda_4$ and polarized in the first direction.

7. The communications system of claim 6, wherein the emitters are light emitting diodes.

8. The communications system of claim 7, wherein the emitters are laser diodes.

9. A communications method comprising the following steps:

emitting a series of pulses from a transmitter through water, wherein each pulse comprises a plurality of electromagnetic component signals, wherein each component signal has a fixed combination of wavelength and polarization state that differs from the wavelength and polarization state combinations corresponding to the other component signals;

selecting the wavelength of each component signal from a group consisting of: a first wavelength $\lambda_1$, a second wavelength $\lambda_2$, a third wavelength $\lambda_3$, and a fourth wavelength $\lambda_4$, all of which are in a blue-green region of an electromagnetic spectrum;

setting the polarization state of each component signal to either a first polarization state or a second polarization state, wherein the first and second polarization states are orthogonal to each other;

encoding data onto each pulse with a combination of mixed wavelength modulation and mixed orthogonal polarization;

receiving each pulse with a receiver that comprises first, second, and third detectors;

detecting substantially only component signals in the first polarized state with the first detector;

detecting substantially only component signals having second and third wavelengths $\lambda_2$ and $\lambda_3$ with the second detector; and detecting substantially only component signals having third and fourth wavelengths $\lambda_3$ and $\lambda_4$ with the third detector.

10. The method of claim 9, further comprising the step of sending periodic calibration pulses from the transmitter to the receiver.

11. The method of claim 10, wherein the first, second, third, and fourth wavelengths $\lambda_1$, $\lambda_2$, $\lambda_3$, and $\lambda_4$ are respectively 405, 465, 473, and 532 nanometers.

12. The method of claim 11, wherein an overall energy per each pulse remains substantially constant from pulse to pulse.

13. The method of claim 12, wherein the transmitter comprises 16 laser diodes.

14. The method of claim 12, wherein the transmitter comprises 7 laser diodes.

* * * * *